(12) United States Patent
Woo et al.

(10) Patent No.: US 9,891,838 B2
(45) Date of Patent: Feb. 13, 2018

(54) METHOD OF OPERATING A MEMORY SYSTEM HAVING A META DATA MANAGER

(71) Applicants: Yeong-Jae Woo, Suwon-Si (KR);
Sungyong Seo, Seongnam-Si (KR);
Otae Bae, Suwon-Si (KR);
Hyun-Seung Jei, Osan-Si (KR)

(72) Inventors: Yeong-Jae Woo, Suwon-Si (KR);
Sungyong Seo, Seongnam-Si (KR);
Otae Bae, Suwon-Si (KR);
Hyun-Seung Jei, Osan-Si (KR)

(73) Assignee: Samsung Electronics Co., Ltd.,
Suwon-si, Gyeonggi-do (KR)

( * ) Notice: Subject to any disclaimer, the term of this patent is extended or adjusted under 35 U.S.C. 154(b) by 80 days.

(21) Appl. No.: 14/995,758

(22) Filed: Jan. 14, 2016

(65) Prior Publication Data

US 2016/0266795 A1     Sep. 15, 2016

(30) Foreign Application Priority Data

Mar. 13, 2015  (KR) ..................... 10-2015-0035049

(51) Int. Cl.
*G06F 3/06* (2006.01)
*G06F 11/14* (2006.01)
*G06F 17/30* (2006.01)

(52) U.S. Cl.
CPC ............ *G06F 3/061* (2013.01); *G06F 3/0655* (2013.01); *G06F 3/0679* (2013.01); *G06F 11/1435* (2013.01); *G06F 17/3012* (2013.01)

(58) Field of Classification Search
CPC ... G06F 3/061; G06F 11/1435; G06F 17/3012
See application file for complete search history.

(56) References Cited

U.S. PATENT DOCUMENTS

| 7,350,105 | B2 | 3/2008 | Aasheim et al. |
| 7,679,133 | B2 | 3/2010 | Son et al. |
| 8,370,563 | B2* | 2/2013 | Lee .......................... G06F 3/061 365/185.09 |
| 8,397,017 | B2 | 3/2013 | Yoshii et al. |
| 8,553,466 | B2 | 10/2013 | Han et al. |
| 8,559,235 | B2 | 10/2013 | Yoon et al. |
| 8,654,587 | B2 | 2/2014 | Yoon et al. |

(Continued)

FOREIGN PATENT DOCUMENTS

| JP | 2010-086009 A | 4/2010 |
| JP | 2012-128545 A | 7/2012 |
| JP | 2013-196155 A | 9/2013 |

*Primary Examiner* — Charles Rones
*Assistant Examiner* — Tian-Pong Chang
(74) *Attorney, Agent, or Firm* — Volentine & Whitt, PLC

(57) ABSTRACT

A method of operating a memory system including a nonvolatile memory, having a meta data region and a user data region, and a memory controller having a meta data manager. The method includes programming data to a memory block of the user data region and, by operation of the meta data manager, generating a meta log based on the programming. The meta log is stored to the memory controller. Upon a power-off operation, selectively storing the meta log to the meta data region of the nonvolatile memory based on status information of the nonvolatile memory.

16 Claims, 28 Drawing Sheets

(56) References Cited

U.S. PATENT DOCUMENTS

| | | | |
|---|---|---|---|
| 2010/0280995 A1* | 11/2010 | Munegowda | G06F 11/1435 707/648 |
| 2010/0312947 A1 | 12/2010 | Luukkainen et al. | |
| 2011/0099325 A1 | 4/2011 | Roh et al. | |
| 2011/0233648 A1 | 9/2011 | Seol et al. | |
| 2012/0069664 A1* | 3/2012 | Kim | G11C 16/0483 365/185.11 |
| 2013/0042054 A1* | 2/2013 | Jung | G06F 12/0246 711/103 |
| 2013/0046918 A1 | 2/2013 | Im | |
| 2013/0067146 A1 | 3/2013 | Zettsu | |
| 2013/0073897 A1 | 3/2013 | Khmelnitsky | |
| 2013/0173850 A1 | 7/2013 | Song | |
| 2014/0229767 A1 | 8/2014 | Kang et al. | |
| 2014/0310483 A1* | 10/2014 | Bennett | G06F 12/00 711/154 |
| 2015/0347247 A1* | 12/2015 | Baek | G06F 12/0891 714/6.11 |

\* cited by examiner

FIG. 10

Initial Meta Data

|  | Main | Spare |  |
| --- | --- | --- | --- |
| 1st Meta Page | Mapping 1 | 1 | Meta Index |
| 2nd Meta Page | Mapping 2 | 2 |  |
|  | ⋮ |  |  |
| Mth Meta Page | Mapping M | M |  |

FIG. 11

| | Mapping 1 | | | | Meta Index |
| --- | --- | --- | --- | --- | --- |
| LA | 1 | 2 | ⋯ | N | 1 |
| PA | 100 | 101 | ⋯ | M | |

FIG. 14

| | RAM(1240) | User Data Region (1112) | Meta Data Region (1111) |
|---|---|---|---|
| Normal Operation | LA \| PA<br>1 \| 100<br>2 \| 5000<br>⋮<br>N \| 5100 | PA \| Main \| Spare<br>100 \| User Data 1 \| 1 \| LA<br>101<br>⋮<br>M | Meta Main \| Meta Spare<br>⋮ |
| PON | LA \| PA | PA \| Main \| Spare<br>100 \| User Data 1 \| 1 \| LA<br>101<br>⋮<br>M | Meta Main \| Meta Spare<br>Meta Log \| 1 \| Meta Index<br>PON<br>⋮<br><br>LA \| 1 \| 2 \| ... \| N<br>PA \| 100 \| 5000 \| ... \| 5100 |
| Initial Mode (Power-On) & Meta Data Recovery | LA \| PA<br>1 \| 100<br>2 \| 5000<br>⋮<br>N \| 5100 | | |

FIG. 15

| | User Data Region (1112) | | | Meta Data Region (1111) | | |
|---|---|---|---|---|---|---|
| | PA | Main | Spare | Main | Spare | |
| Receive PON Repeatedly | 100 | User Data 1 | 1 | Meta Log 1 | 1 | Meta Index |
| | 101 | User Data 2 | 2 | PON | | |
| | 102 | User Data 3 | 3 | Meta Log 2 | 1 | |
| | | | | PON | | |
| | | ⋮ | | Meta Log 3 | 1 | |
| | | | | PON | | |
| | | | | ⋮ | | |
| | M | | | | | |

METHOD OF OPERATING A MEMORY SYSTEM HAVING A META DATA MANAGER

CROSS-REFERENCE TO RELATED APPLICATION

This U.S. non-provisional patent application claims priority under 35 USC § 119 to Korean Patent Application No. 10-2015-0035049 filed on Mar. 13, 2015, in the Korean Intellectual Property Office (KIPO), the entire contents of which is hereby incorporated by reference herein.

BACKGROUND

At least some embodiments of the disclosure relate generally to memory systems, memory devices, and methods of operating a memory system, and more particularly to methods of operating a memory system including a nonvolatile memory device.

Memory systems including one or more nonvolatile semiconductor memory devices have become staple components in contemporary consumer electronic products. A variety of nonvolatile semiconductor memory devices are known, including as examples, the electrically erasable programmable read only memory (EEPROM), the phase-change random access memory (PRAM), the magnetic random access memory (MRAM), and the resistance read only memory (ReRAM). Within the broad class of nonvolatile semiconductor memory devices, flash memory provides certain advantages such as rapid reading speed, low power consumption, very dense data storage capacity, etc. As a result, many contemporary memory systems incorporated in contemporary digital computational platforms and consumer electronics include flash memory as a data storage medium.

When a nonvolatile memory device programs data, the memory device programs user data and meta data. The user data includes a file that a user application is willing to program. The meta data includes data properties of the file or user data, and a block location of the programmed user data.

SUMMARY

At least some embodiments of the disclosure provide a memory system and an operation method, executed by a meta data manager, for improving the life of a memory device and reducing the wear-out phenomenon of a meta data region using the meta data manager.

According to one or more example embodiments of the disclosure, there is provided a method of operating a memory system including a nonvolatile memory, having a meta data region and a user data region, and a memory controller including a meta data manager. The method includes programming first data in a first memory block of the user data region. By operation of the meta data manager, generating a meta log based on the programming and storing the meta log in the memory controller. Upon a power-off operation, selectively storing the meta log in the meta data region of the nonvolatile memory based on status information of the nonvolatile memory.

The status information of the nonvolatile memory is a number of programming operations performed in the first memory block after a last meta log storing operation. The meta data manager, if the number of performed programming operations is greater than a first reference value, stores the meta log to the meta data region of the nonvolatile memory. If the number of performed programming operations is less than or equal to the first reference value, the meta data manager skips a meta log storing operation.

The status information of the nonvolatile memory is an amount of data programmed to the first memory block after a last meta log storing operation. The meta data manager, if the amount of programmed data is greater than a second reference value, stores the meta log to the meta data region of the nonvolatile memory. If the amount of programmed data is less than or equal to the second reference value, the meta data manager skips a meta log storing operation.

The status information of the nonvolatile memory is a number of meta log operations generated after a last meta log storing operation. The meta data manager, if the number of meta log operations is greater than a third reference value, stores the meta log to the meta data region of the nonvolatile memory. If the number of meta log operations is less than or equal to the third reference value, the meta data manager skips a meta log storing operation.

The status information of the nonvolatile memory is a number of erase operations of the meta data region. The meta data manager, if the number of erase operations of the meta data region is less than a fourth reference value, stores the meta log to the meta data region of the nonvolatile memory. If the number of erase operations of meta data region is greater than or equal to the fourth reference value, the meta data manager skips a meta log storing operation.

The status information of the nonvolatile memory is a difference value between a number of erase operations of the meta data region and a number of erase operations of the first memory block. The meta data manager, if the difference value is less than a fifth reference value, stores the meta log to the meta data region of the nonvolatile memory. If the difference value is greater than, or equal to the fifth reference value, the meta data manager skips a meta log storing operation.

The status information of the nonvolatile memory is a number of received power off notice signals to the memory controller for a first time. The meta data manager, if the number of received power off notice signals is less than a sixth reference value, stores the meta log to the meta data region of the nonvolatile memory. If the number of received power off notice signals is greater than, or equal to the sixth reference value, the meta data manager skips a meta log storing operation.

The memory controller comprises a Random Access Memory (RAM) configured to store the meta log. The storing the meta log in the RAM comprises programming the meta log, stored in the RAM, to the meta data region of the nonvolatile memory and storing a power-off notice signal receiving mark to a page adjacent to a page storing the meta log of the meta data region.

The meta log comprises a first physical address of the first memory block storing the first data. The first memory block comprises a plurality of pages. A first page of the plurality of pages comprises a main part and a spare part, the first data is stored at the main part, and a first logical address corresponding to the first physical address is stored in the spare part. The meta data region comprises a first meta page, the meta page comprises a meta main part and a meta spare part, mapping information is stored in the meta main part of the first meta page, and a meta index is stored in the meta spare part.

The meta data region comprises initial meta data including a plurality of meta indexes and the meta log. The nonvolatile memory comprises a three-dimensional flash memory cell array implementing the meta data region and the user data region.

According to one or more example embodiments of the disclosure, a method of operating a memory controller, including a meta data manager, is disclosed. The memory controller is configured to control an operation condition of a nonvolatile memory having a meta data region and a user data region. The method includes programming first data to a first word line of a first memory block of the user data region of the nonvolatile memory. By operation of the meta data manager, generating a meta log based on the programming and storing the generated meta log to the memory controller. Upon a power-off operation, selectively storing the meta log to the meta data region based on a number of programming operations performed to the first memory block.

The memory controller includes a Random Access Memory (RAM), and the meta log is stored in the RAM. The selectively storing the meta log to the meta data region includes programming the meta log stored in the RAM to the meta data region of the nonvolatile memory, programming a power off notice signal to a page adjacent to a page programmed with the meta log of the meta data region. The first word line corresponds to a main part and a spare part, the first data is stored in the main part, and a first logical address corresponding to the first word line is stored in the spare part.

The meta data region includes a first meta page, the first meta page includes a meta main part and meta spare part, the meta data manager stores mapping information to the meta main part, and stores a meta index to the meta spare part. The meta data region includes initial meta data and the initial meta data includes initial mapping information. The nonvolatile memory includes a three-dimensional flash memory cell array implementing the meta data region and the user data region.

According to one or more example embodiments of the disclosure, a method, executed by a meta-data processor, of managing storage of meta data in a nonvolatile memory includes generating a meta log of data programmed in a memory block within a user-data region of the nonvolatile memory and selectively storing, based on status information of the nonvolatile memory, the meta log in a meta-data region of the nonvolatile memory, upon receiving a power-off signal.

BRIEF DESCRIPTION OF THE DRAWINGS

The above and other features and advantages of example embodiments of the disclosure will become more apparent by describing in detail example embodiments of the disclosure with reference to the attached drawings. The accompanying drawings are intended to depict example embodiments of the disclosure and should not be interpreted to limit the intended scope of the claims. The accompanying drawings are not to be considered as drawn to scale unless explicitly noted.

FIG. 10 is a concept diagram illustrating the initial meta data stored in the meta data region.

FIG. 11 is a table illustrating a configuration of the mapping information stored in the meta data region of the memory device.

FIG. 13 and FIG. 14 are concept diagrams illustrating how the memory controller recovers the meta data.

FIG. 15 is a concept diagram illustrating how the SPO occurs repeatedly at the memory system.

DETAILED DESCRIPTION

Figure 1:
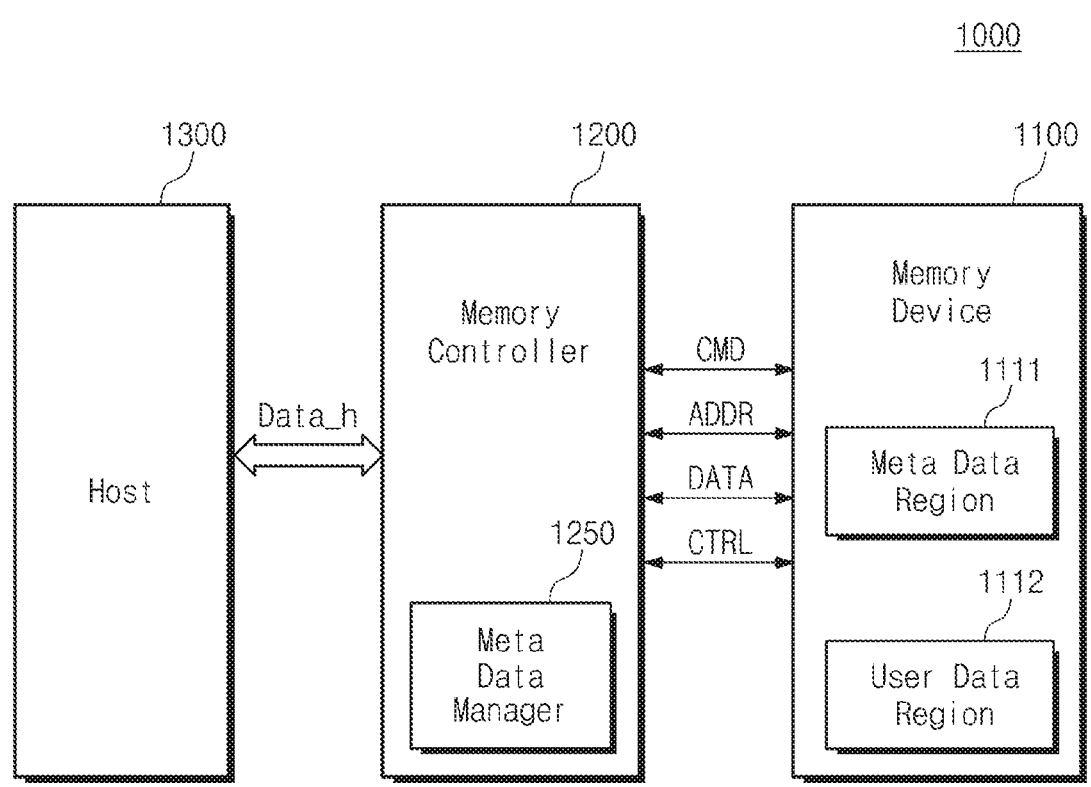
FIG. 1 is a block diagram illustrating a memory system according to at least one embodiment of the disclosure.

Detailed example embodiments of the disclosure are disclosed herein. However, specific structural and functional details disclosed herein are merely representative for purposes of describing example embodiments of the disclosure. Example embodiments of the disclosure may, however, be embodied in many alternate forms and should not be construed as limited to only the embodiments set forth herein.

Accordingly, while example embodiments of the disclosure are capable of various modifications and alternative forms, embodiments thereof are shown by way of example in the drawings and will herein be described in detail. It should be understood, however, that there is no intent to limit example embodiments of the disclosure to the particular forms disclosed, but to the contrary, example embodiments of the disclosure are to cover all modifications, equivalents, and alternatives falling within the scope of example embodiments of the disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the disclosure. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the disclosure. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the disclosure are described herein with reference to schematic illustrations of idealized embodiments (and intermediate structures) of the disclosure. As such, variations from the shapes of the illustrations as a result, for example, of manufacturing techniques and/or tolerances, are to be expected. Thus, example embodiments of the disclosure should not be construed as limited to the particular shapes of regions illustrated herein but are to include deviations in shapes that result, for example, from manufacturing.

Unless otherwise defined, all terms, including technical and scientific terms, used herein have the same meaning as commonly understood by one of ordinary skill in the art to which at least some embodiments of the disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

I. Memory System Including a Meta Data Manager

FIG. 1 is a block diagram illustrating a memory system according to at least one embodiment of disclosure. Referring to FIG. 1, a memory system 1000 comprises a memory device 1100, a memory controller 1200 and a host 1300.

The memory device 1100 will be operationally controlled by the memory controller 1200 to perform a sequence of variously defined "operations" in response to one or more requests, commands, and/or instructions received from the host 1300, and/or the memory controller 1200. Operations performed by the memory device 1100 under the control of the memory controller 1200 may vary in definition between different implementations of the memory system 1000, but will typically include at least read, write (i.e., program), and/or erase operations, as well as certain housekeeping operations necessary for the efficient overall performance of the memory system 1000. The memory device 1100 may include a plurality of memory blocks.

The memory device 1100 may include a meta data region 1111 and a user data region 1112. The meta data region 1111 may be implemented as one or more separately provisioned semiconductor memory chips, and/or as a designated portion (or combination of portions) of a large memory cell array also used to implement the user data region 1112.

In certain embodiments, the meta data region 1111 may be implemented using an arrangement of single-level memory cells (SLC), each SLC being configured to store a single bit of data per memory cell. In contrast, the user data region 1112 may be implemented using an arrangement of multi-level memory cells (MLC), each MLC being configured to store 2 or more bits of data per memory cell.

Alternately, both the meta data region 1111 and user data region 1112 may be implemented using MLC, wherein only a Least Significant Bit (LSB) of each MLC is used to store single-bit data in the meta data region 1111 in response to a single bit program operation.

Alternately, both of the meta data region 1111 and the user data region 1112 may be implemented using SLC.

The data stored in the meta data region 1111 may include meta data and/or a meta log. The meta data may include attributes of a file data (or user data) stored in the user data region 1112 in response to the requests from the host 1300. The meta data may include a location of blocks in which the file data (or user data) is stored. The meta log may be generated when the stored meta data is changed. The meta log may include the changed information regarding the meta data. The data stored in the user data region 1112 may be received externally by a write request of host 1300.

The memory controller 1200 is functionally connected between the memory device 1100 and the host 1300. The memory controller 1200 will control read and/or write operation of the memory device 1100 in response to requests of the host 1300. The memory controller 1200 may be used to receive host-defined data (e.g., write data or incoming data, generally designated "Data_h"), and to receive memory device-defined data (e.g., read data retrieved from the memory device 1100 during a read or similar operation, generally designated "DATA").

In addition to controlling exchanges of various data between the host 1300 and memory device 1100, the memory controller 1200 may also be used to generate and communicate various command information (CMD) and address information (ADDR) related to the exchange of various data, as well as one or more control signals (CTRL) to the memory device 1100.

In the illustrated embodiment of FIG. 1, the memory controller 1200 comprises a meta data manager 1250. The meta data manager 1250 may control operations regarding the meta data. The meta data manager 1250 may generate the meta data, and selectively store the generated meta data in the meta data region 1111 according to a status of the memory system 1100.

In at least the example embodiment of the disclosure illustrated in FIG. 1, upon performing a program, in the case of the mapping information being changed, the memory system 1000 may generate the meta log. The memory system 1000 may selectively store the meta log in the meta data region 1111 of the memory system 1000 according to a number of programming operations performed in the memory device 1100. According to embodiments of the disclosure, the memory system 1000 may selectively store the meta log in the meta data region 1111 of the memory system 1000 according to the amount of program data stored in the memory device 1100. According to embodiments of the disclosure, the memory system 1000, according to the number of generated meta logs, may selectively store the meta logs in the meta data region 1111 of the memory device 1100. According to embodiments of the disclosure, the memory system 1000, according to a number of performed erase operations, may selectively store the meta logs in the meta data region 1111 of the memory device 1100.

According to embodiments of the disclosure, the memory system 1000, according to a number of erase operations of the meta data region 1111 and the user data region 1112, may selectively store the meta logs in the meta data region 1111 of the memory device 1100. According to embodiments of the disclosure, the memory system 1000, according to a number of received power off notice signals, may selectively store the meta logs in the meta data region 1111 of the memory device 1100. According to embodiments of the disclosure, the memory system 1000, upon power-off operation, may selectively store the generated meta logs in the meta data region 1111 such that the life of the memory device 1100 may be increased.

Figure 2:
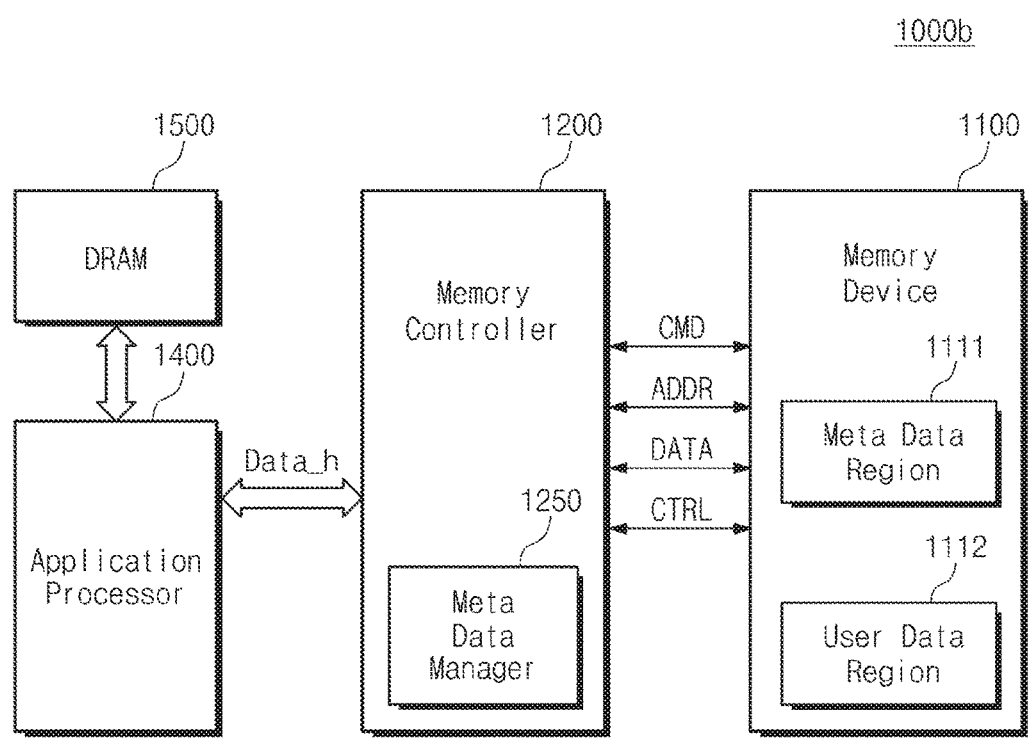
FIG. 2 is a block diagram further illustrating, in one example, the memory system of FIG. 1.

FIG. 2 is a block diagram further illustrating, in one example (1000*b*), the memory system 1000 of FIG. 1. Referring to FIG. 2, elements of memory device 1100 and the memory controller 1200 of the memory system 1000*b* may be same as the elements of FIG. 1, such that a repeated explanation is omitted. Referring to FIG. 2, the memory system 1000*b* may include an application processor 1400 and a Dynamic Random Access Memory (DRAM) 1500. The memory system 1000*b* may store meta data, which the meta data manager 1250 generates, in DRAM 1500 via the application processor 1400.

Figure 3:
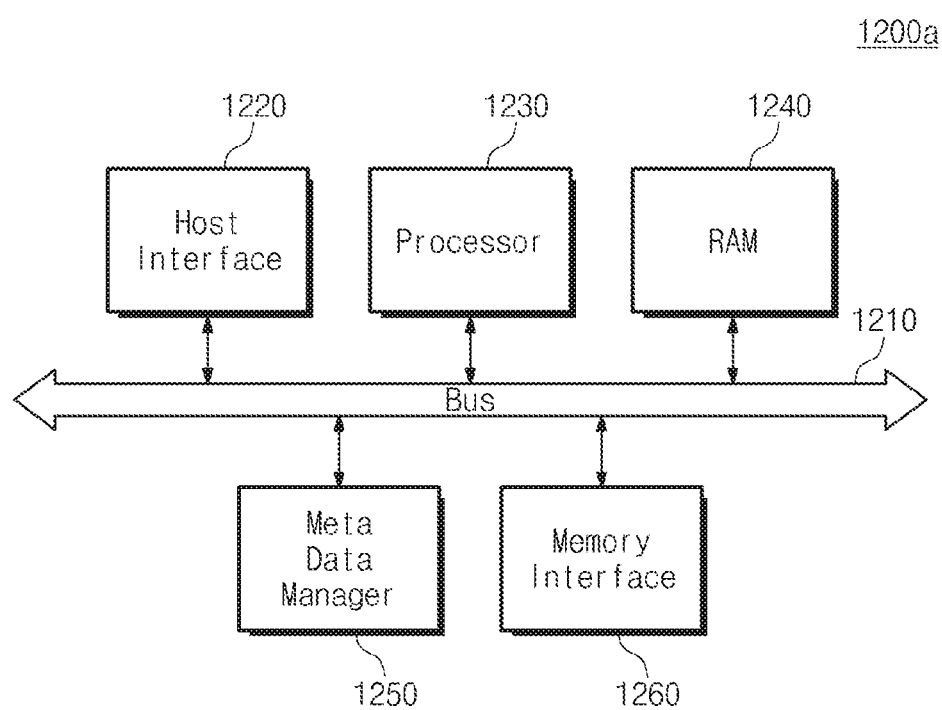
FIG. 3 is a block diagram further illustrating, in one example, the memory controller of FIG. 1.

FIG. 3 is a block diagram further illustrating, in one example (1200*a*), the memory controller 1200 of FIG. 1. Referring to FIG. 2, the memory controller 1200*a* comprises in relevant part: a system bus 1210, a host interface 1220, processor 1230, a Random Access Memory (RAM) 1240, the meta data manager 1250, and a memory interface 1260.

The system bus 1210 generally provides a connection channel between the various elements of the memory controller 1200*a* noted above.

The host interface 1220 may be used to enable communication with the host 1300 and/or the application processor 1400 using one or more conventionally understood communication standards. For example, the host interface 1220 may enable one or more communication standards, such as Universal Serial Bus (USB), Peripheral Component Interconnection (PCI), PCI-express (PCI-E), Advanced Technology Attachment (ATA), Serial-ATA, Parallel-ATA, Small Computer Small Interface (SCSI), Enhanced Small Disk Interface (ESDI), Integrated Drive Electronics (IDE), firewire, etc.

The processor 1230 may be used to receive host-defined data (Data_h) as well as related command and address information from the host 1300, and to control the overall operation of the memory controller 1200.

The RAM 1240 may be used as a cache or buffer memory to temporarily store, for example, data (e.g., Data_h and/or DATA), command information, address information, computational information, and other types of data and/or information necessary to the functionality of the memory controller 1200.

As described above in relation to FIG. 1, the meta data manager 1250 may control the meta data. Also, the meta data manager 1250 may check a status of the memory device 1100, and according to the checking result, may perform meta data storing operation. Operations of the meta data manager 1250 will be described in detail below the FIG. 8 through FIG. 25.

The memory interface 1260 may be used to enable communication of data between the memory controller 1200 and the memory device 1100. For example, the memory interface 1260 may be a NAND type flash memory interface, or a vertical NAND (VNAND) type flash memory interface, etc.

Figure 4:
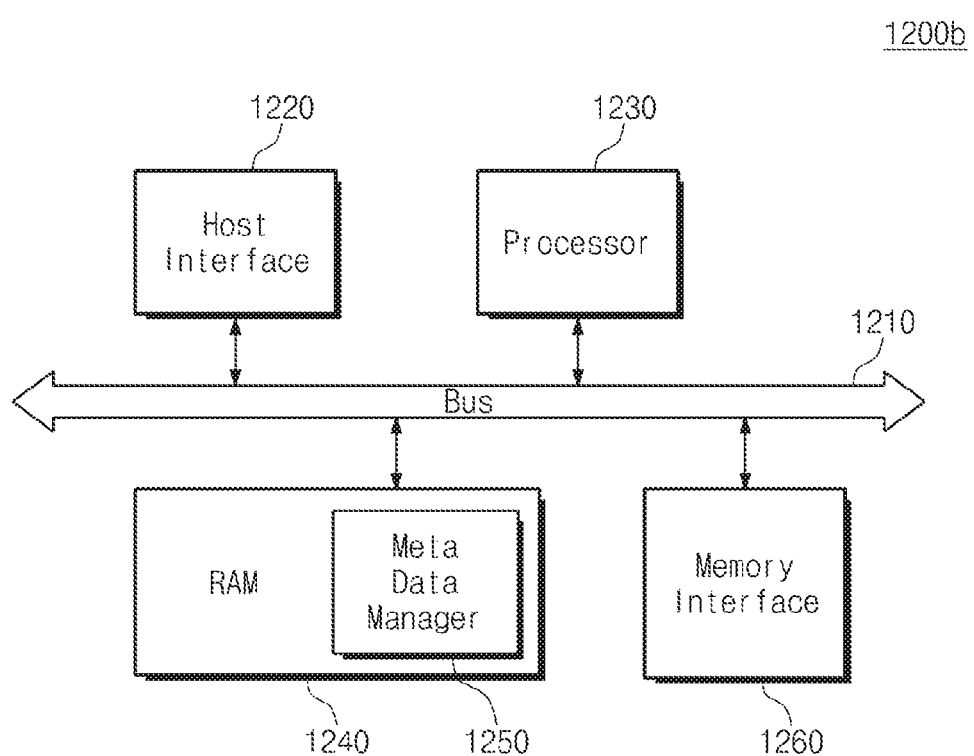
FIG. 4 is a block diagram further illustrating another example of the memory controller of FIG. 1

FIG. 4 is a block diagram further illustrating, in another example (1200*b*), the memory controller 1200 of FIG. 1. The elements described in relation to the memory controller 1200*a* of FIG. 2 are respectively the same as those shown in FIG. 3, except that certain software components used to implement the meta data manager 1250 are shown as being specifically stored by the RAM 1240 during operation of the memory controller 1200*b*.

The memory device according to at least one example embodiment of the disclosure, may be applied not only to a 2-dimensional structure flash memory but also a 3-dimensional structure flash memory 3D Flash memory.

Figure 5:
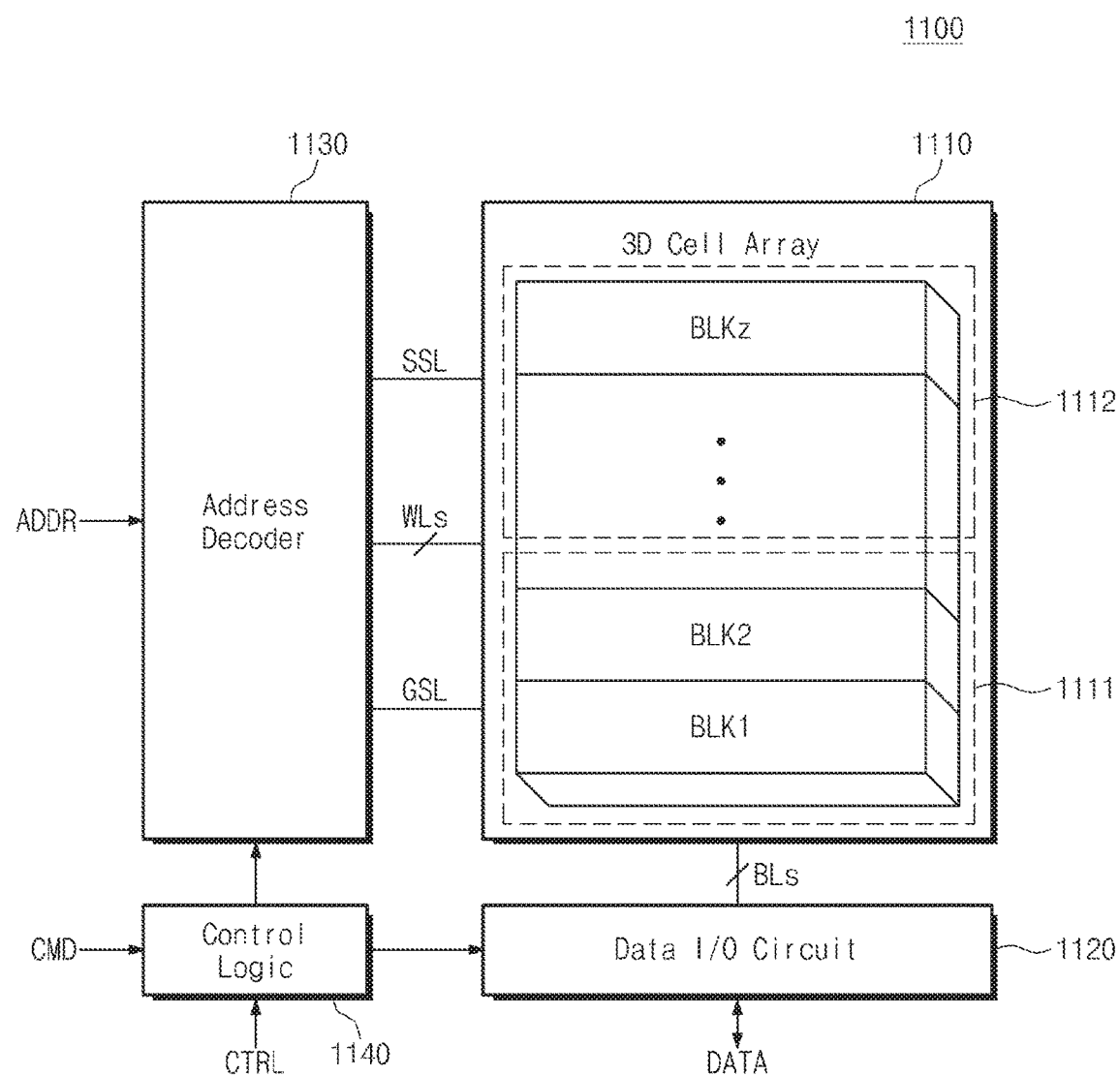
FIG. 5 is a block diagram further illustrating, in one example, the memory device being implemented, wholly or in part, to include a three-dimensional (3D) flash memory.

FIG. 5 is a block diagram further illustrating, in one example, the memory device 1100 being implemented, wholly or in part, to include a three-dimensional (3D) flash memory. Thus, referring to FIG. 5, the memory device 1110 comprises a 3D flash memory cell array 1110, a data input/output (I/O) circuit 1120, an address decoder 1130, and control logic 1140.

The 3D flash memory cell array 1110 is also logically and/or physically partitioned into a plurality of memory blocks (BLK1 to BLKz), wherein each memory block has a three-dimensional (or vertical) structure. Each memory block being an erasable unit for the memory device 1100.

The data I/O circuit 1120 may be used to functionally connect a plurality of bit lines BLs extending across the 3D flash memory cell array 1110 to various external circuits. In this configuration, the data I/O circuit 1120 may be used to receive write data (or encoded write data), DATA, and may also be alternately used to receive read data retrieved from the 3D flash memory cell array 1110.

The address decoder 1130 may be used to functionally connect a plurality of word lines WLs as well as at least one ground selection line GSL and string selection line SSL extending across the 3D flash memory cell array 1110 to various external circuits. In this configuration, the address decoder 1130 may be used to select one or more word lines in response to received address information ADDR.

The control logic 1140 may be used to control the overall execution of at least write (program), read, erase, and garbage collection operations by the memory device 1100 in response to received command CMD and control CTRL signals. That is, the control logic 1140 may be used to control operation of the address decoder 1130 such that a specified program voltage is applied to a selected word line during a program operation, and to further control the data I/O circuit 1120 to receive and hold write data DATA, to be programmed during the program operation.

Figure 6:
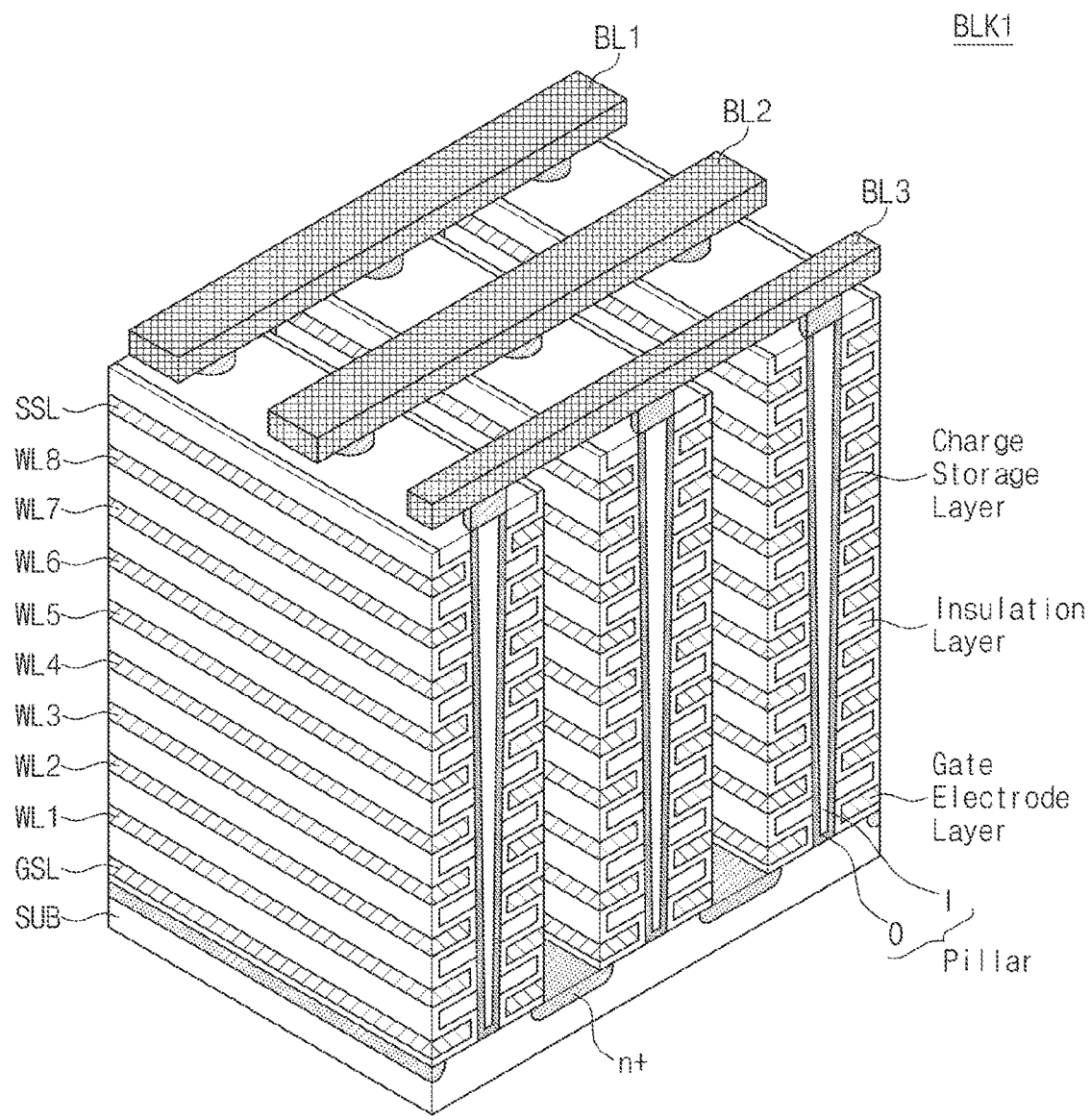
FIG. 6 is a perspective view illustrating, in one example, a portion of a 3D flash memory array corresponding to a first memory block (BLK1) shown in FIG. 5.

FIG. 6 is a perspective view illustrating, in one example, a portion of a 3D flash memory array corresponding to a first memory block (BLK1) shown in FIG. 5. Referring to FIG. 6, the first memory block, as an example of similarly configured memory blocks, is formed in a direction perpendicular to a principal substrate SUB. An n+ doping region is selectively formed in the substrate. A gate electrode layer and an insulation layer are then sequentially deposited on the substrate. A charge storage layer is formed between the gate electrode layer and the insulation layer.

If the gate electrode layer and the insulation layer are patterned in a vertical direction, a V-shaped pillar is formed. The pillar may thus be connected with the substrate via the gate electrode layer and the insulation layer.

An outer portion 'O' of the pillar forms a semiconductor channel, while an inner portion 'I' forms an insulation material (e.g., silicon oxide) around the semiconductor channel.

The gate electrode layer of the memory block BLK1 is connected to a ground selection line GSL, a plurality of word lines WL1 to WL8, and a string selection line SSL. In this manner, the pillar BLK1 is connected with a plurality of bit lines BL1 to BL3. FIG. 6 illustrates an example in which one memory block BLK1 has two (2) ground/string selection lines and eight (8) word lines WL1 to WL8.

However, at least some embodiments of the disclosure may have many different signal line definitions.

Figure 7:
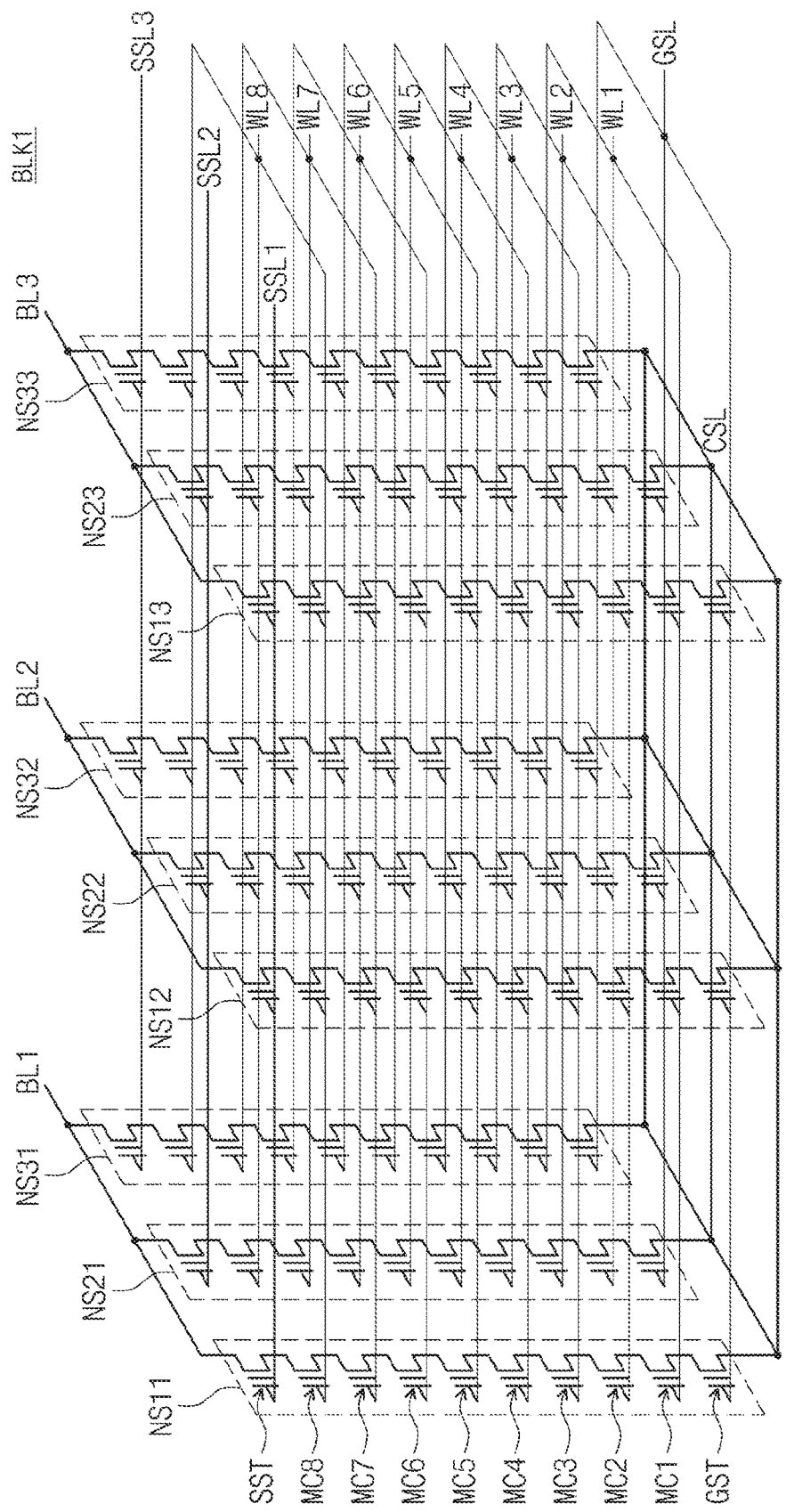
FIG. 7 is an equivalent circuit diagram for the partial memory cell array structure shown in FIG. 6.

FIG. 7 is an equivalent circuit diagram for the first memory block BLK1 shown in FIG. 6. Referring FIG. 7, NAND strings NS11 to NS33 are connected between bit lines BL1 to BL3 and a common source line CLS. Each NAND string (e.g., NS11) includes a string selection transistor SST, a plurality of memory cells MC1 to MC8, and a ground selection transistor GST.

The string selection transistor SST may be connected with one of string selection lines SSL1 to SSL3. The memory cells MC1 to MC8 may be connected with corresponding word lines WL1 to WL8, respectively. The ground selection transistor GST may be connected with a ground selection line GSL. A string selection transistor SST may be connected with a bit line, and a ground selection transistor GST may be connected with a common source line CLS.

Word lines (e.g., WL1) having the same height may be commonly connected, and the ground selection line GSL and the string selection lines SSL1 to SSL3 may be separated from one from another. During programming of the constituent memory cells of a designated "page" connected to a first word line WL1 and included in NAND strings NS11, NS12, and NS13, a first word line WL1, a first string selection line SSL1, and the ground selection line GSL will be selected by the various control circuits.

II. Method of Operating the Memory System Including a Meta Data Manager

Figure 8:
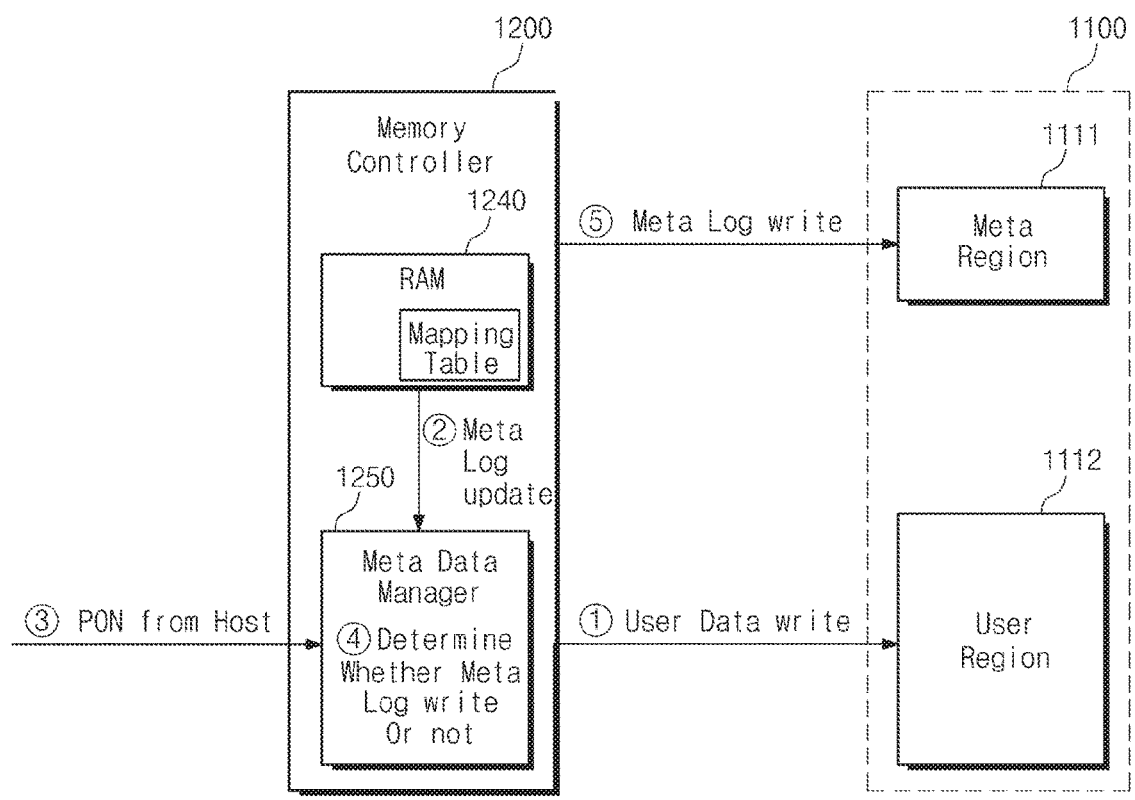
FIG. 8 is a concept diagram illustrating, in one example, the operation of the meta data manager of the memory system of FIG. 1.

FIG. 8 is a concept diagram illustrating, in one example, the operation of the meta data manager of the memory system of FIG. 1. FIG. 8 is illustrating that the meta data manager 1250 stores the meta log in the meta data region.

The memory system including a flash memory, for managing a file data and improving performance of the memory system, may use a meta data region. The memory system, for storing the data in the user data region, may generate and store mapping information. The mapping information may include a physical address according to a logical address.

Still referring to FIG. 8, the memory controller 1200 may store (or program) the user data in the user data region 1112 (①)). The data stored in the user data region 1112 may be data received from the host 1300. For example, the memory controller 1200 may receive a program command and data from the host, and may program the received data in the user data region 1112.

After programming of the user data region, the memory controller 1200 may update the mapping information stored in the RAM 1240 (②)). For example, the memory controller 1200 may store the mapping information (or meta log). The mapping information (or meta log) may be information regarding a logical address for managing received data, and a physical address of the user data region 1112 storing the received data. A mapping table may be organized by gathering the mapping information of logical addresses and the physical addresses. The mapping table may be stored in the RAM 1240 of the memory controller 1200.

The memory controller 1200 may receive a Power Off Notification (PON) signal from the host 1300 (③)). For example, an event may occur that power provided to the memory system 1000 is interrupted normally. The memory controller 1200, before the power is interrupted, may receive the PON from the host 1300.

When the memory controller receives the PON signal, the meta data manager 1250, according to a status of the memory system 1000, may determine whether the stored meta data of the RAM 1240 of the memory controller is programmed in the memory device 1100 (④)). For example, if the number of programming operations performed after a point of time, for the last meta log storing, is greater than a reference value, the meta data manager 1250 may determine to store the meta log in the meta data region 1111 of the memory device 1100. The meta data manager 1250 may store the meta log stored in RAM 1240 in the memory device 1100 without receiving the PON signal. It will be fully described with reference to the FIG. 17 through FIG. 23 that the meta data manager 1250 determines whether the meta log is stored in the meta data region 1111.

The memory controller 1200, according to an instruction of the meta data manager 1250, may program (or store) the meta log stored in the RAM 1240 of the memory controller in the meta data region 1111 of the memory device 1100 (⑤)).

Figure 9:
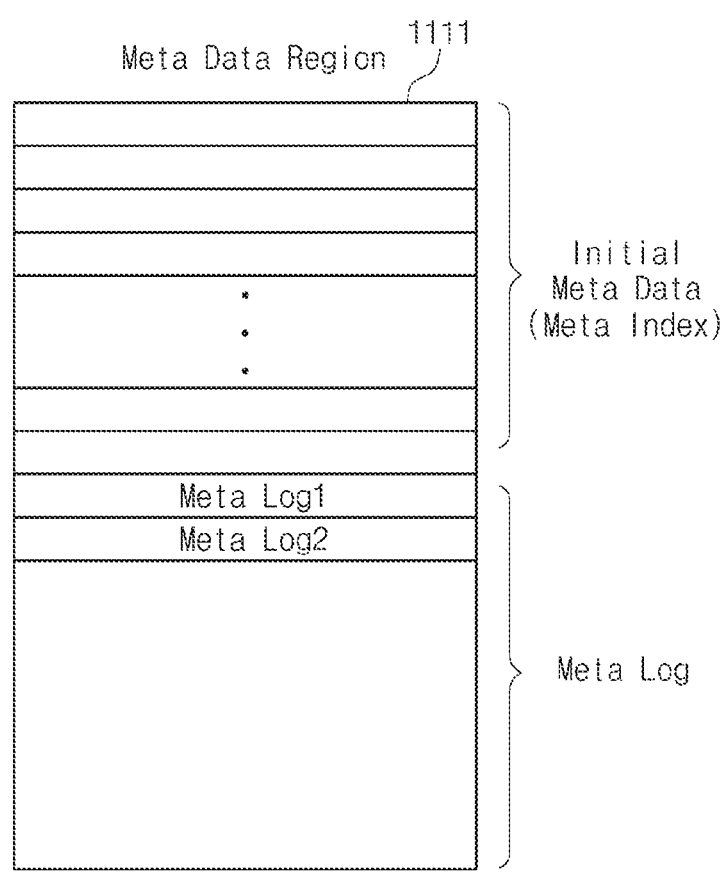
FIG. 9 is a concept diagram illustrating the meta data stored in the meta data region of the memory device.

FIG. 9 is a concept diagram illustrating the meta data stored in the meta data region of the memory device. Referring to FIG. 9, the meta data may be stored in the meta data region 1111 of the memory device 1100. The meta data may include the mapping information regarding the data stored in the memory device 1100, and information regarding operations of the memory device 1100. For concise description, the meta data is assumed to be mapping information.

The meta data stored in the meta data region 1111 may include initial meta data and a meta log. The initial meta data may be mapping information stored at the beginning of an operation of the memory system 1000. The initial mapping data may include a meta index. The meta index may be selected according to groups of the mapping information.

The meta index will be fully described with reference to FIG. 10. The meta log may be data generated when the mapping information of the initial meta data is changed.

FIG. 10 is a concept diagram illustrating the initial meta data stored in the meta data region. Referring to FIG. 10, the meta data region 1111 may include a plurality of pages. Each of the meta pages may include a meta main part and a meta spare part. The meta main part may store mapping information of received data. The meta spare part may store the meta index corresponding to a group of mapping information. The meta index, upon reading data from the user data region 1112, may be used to ascertain the mapping information of the read data.

For example, the mapping information stored in the meta main part of a first meta page ($1^{st}$ meta page) may be first mapping information (Mapping 1). A first meta index corresponding to the first mapping information may be stored in the meta spare part of the first meta page. The mapping information stored in the meta main part of a second meta page ($2^{nd}$ meta page) may be second mapping information (Mapping 2). A second meta index corresponding to the second mapping information may be stored in the meta spare part of the second meta page. The mapping information stored in the meta main part of an $M^{th}$ meta page may be $M^{th}$ mapping information (Mapping M). An $M^{th}$ meta index corresponding to the $M^{th}$ mapping information may be stored in the meta spare part of the $M^{th}$ meta page.

FIG. 11 is a table illustrating a configuration of the mapping information stored in the meta data region of the memory device. Referring to FIG. 11, the mapping information may include a Logical Address (LA) and a Physical Address (PA). The LA may be an address used when the memory controller 1200 stores data. The PA may be a real address storing data in the memory device 1100. For example, the first mapping information may include mapping information of a data capacity of the meta main region of the first meta page. The mapping information stored in the first meta page may be the first mapping information.

For example, the first mapping information may correspond to the first meta index. If the LA of the memory controller 1200 is "1", the memory controller may program data to where the PA of the memory device 1100 is "100". If the LA of the memory controller 1200 is "2", the memory controller may program data where the PA of the memory device 1100 is "101". If the LA of the memory controller 1200 is "N", the memory controller may program data where the PA of the memory device 1100 is "M".

Figure 12:
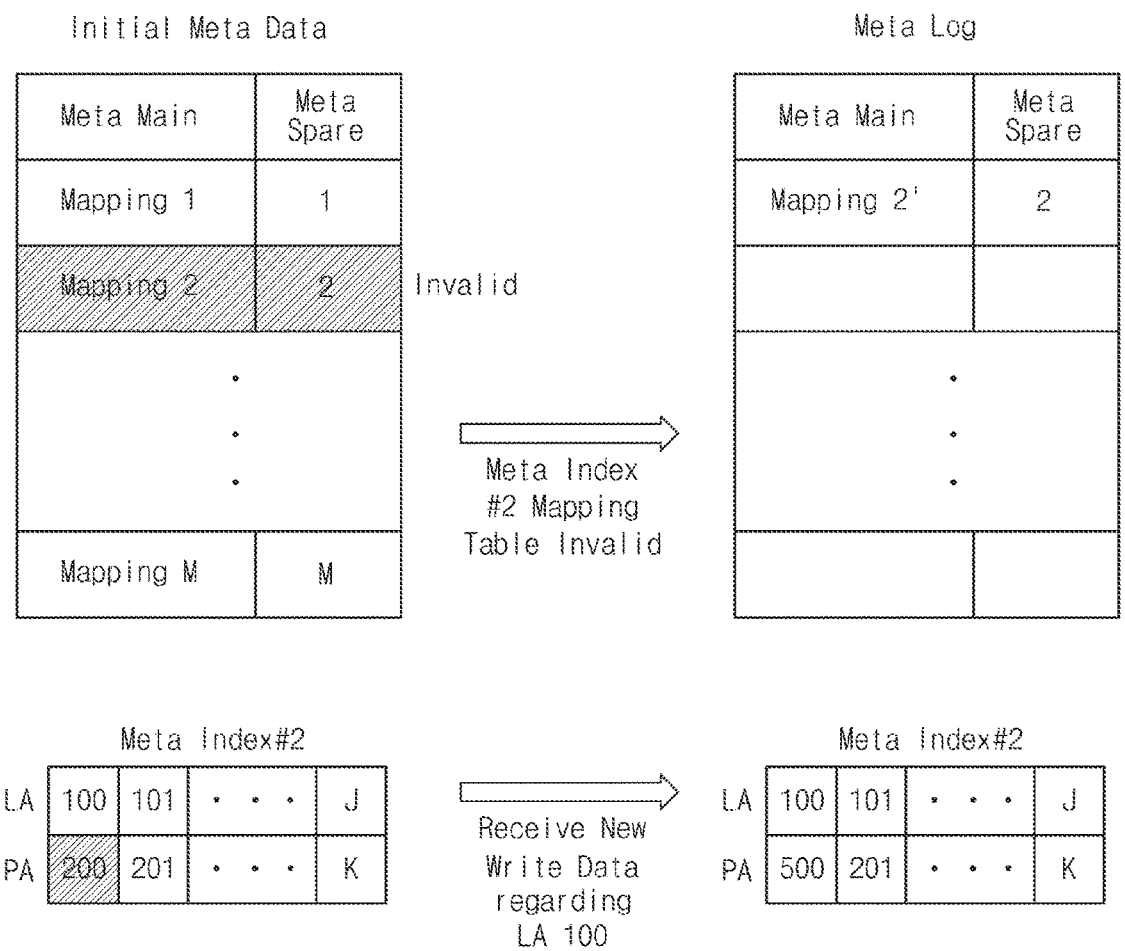
FIG. 12 is a concept diagram illustrating how to generate the meta log by changing the mapping information.

FIG. 12 is a concept diagram illustrating how to generate the meta log by changing the mapping information. Referring to FIG. 12, if the mapping information is stored in the initial meta data, the meta data manager 1250 may generate a new meta log corresponding to the changed mapping information.

For example, it is assumed that the second mapping information is changed. According to the second mapping information of the initial meta data, the memory controller 1200 may program data corresponding to LA 100, to where PA is 200. After the programming, if the memory controller 1200 receives new valid data corresponding to the LA 100, the memory controller 1200 may program the valid data of LA 100 to PA 500, and invalidate the stored data of PA 200.

If the valid data of LA 100 is programmed to PA 500, which is different from PA 200 stored in the initial meta data, the meta data manager 1250 may generate a meta log (Mapping 2') regarding the second mapping information. The meta data manager 1250 may generate the second meta log (Mapping 2') corresponding to the second mapping information, and store meta index 2 in the meta spare part. Thereafter, when the memory controller 1200 reads the meta data region, the memory controller 1200 may read the initial meta data and meta logs. The meta data manager 1250 may ascertain the meta index of the meta log, and replace the mapping information of the initial meta data including the identical meta index, with the mapping information stored in the meta log.

Figure 13:
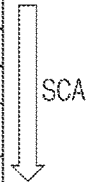

FIG. 13 and FIG. 14 are concept diagrams illustrating that the memory controller recovers the meta data. The memory controller 1200 and the meta data manager 1250 may selectively perform the operations described in FIG. 13 and FIG. 14.

Referring to FIG. 13, the memory controller 1200 may store the mapping information changed during operation of the memory system 1000. The memory controller 1200 may program a plurality of user data (user data 1, user data 2, . . . , user data N) in the user data region of the memory device 1100. The memory controller 1200 may store the meta log in the meta data region of the memory device 1100.

The user data region 1112 may include a plurality of pages. Each of the pages may include a main part and a spare part. The user data may be programmed in the main part of each of the pages. The LA corresponding to the stored data of the page may be programmed in the spare part.

For example, the first user data (user data 1) may be programmed in the main part of the first page where the PA is 100. LA 1 corresponding to the first user data may be programmed in the spare part of the first page. The second user data (user data 2) may be programmed in the main part of the second page where the PA is 101. LA 2 corresponding to the second user data may be programmed in the spare part of the second page. The $N^{th}$ user data (user data N) may be programmed in the main part of the $N^{th}$ page where the PA is "M". LA "N" corresponding to the $N^{th}$ user data may be programmed in the spare part of the $N^{th}$ page.

The memory controller 1200 may generate the meta log when the mapping information of the memory device 1100 is changed. Upon the memory device 1100 performing a power off operation, the memory controller 1200 may program the meta log regarding the changed mapping information in the meta data region 1111.

As the memory system 1000 performs at least one operation (read, program, erase, etc.), the supply power can be suddenly interrupted. This state is referred to as Sudden Power Off (SPO). Upon SPO occurring, the memory system 1000 may terminate the operation it is currently performing before programming the changed mapping information in the meta data region.

If the supply voltage of the memory system 1000 is interrupted suddenly, the mapping information stored in the RAM 1400 of the memory controller 1200 may disappear before the updating of the meta data region 1111 of the memory device 1100. In the event of SPO, if the meta log generated by the change of the mapping information is not updated in the meta data region 1111, and the supply voltage of the memory system 1000 is off, the memory controller 1200, in the next power on operation, may recover the mapping information by scanning the spare part of the user data region.

For example, still referring to FIG. 13, after the SPO occurs, the supply voltage is interrupted. Therefore, the meta data stored in the RAM 1240 may have disappeared. After the SPO, if the supply voltage of the memory system 1000 is provided again, the memory controller 1200 may scan the memory block of user data region 1112, which was programmed last before the SPO. If the memory controller 1200 scans the user data region, the meta data manager 1250 may read the spare part of the memory block and organize the mapping information of the LA and PA. In this manner, the memory controller 1200 may recover the mapping information stored in RAM 1240 before the SPO.

FIG. 14 is a concept diagram illustrating the meta data manager recovering meta data.

Referring to FIG. 14, a normal operation mode is the state of memory system 1000 before the supply voltage is interrupted. The RAM 1240 of memory controller 1200 may include changed mapping information. In the user data region 1112 of the memory device 1100, the LA corresponding to the user data may be programmed. For example, if valid first data corresponding to the LA "1" is programmed in the memory device 1100, the meta data manager 1250 may store the mapping information of PA "100" corresponding to LA "1", PA "5000" corresponding to LA "2", and PA "5100" corresponding to LA "N" in RAM 1240 as the initial mapping information. The first user data and LA "1" corresponding to the first user data may be programmed in the page of PA "100". Upon normal operation mode, the meta data manager 1250 of the memory controller 1200 may not update the mapping information stored in the RAM 1240 in the meta data region 1111 in real time.

If the user of the memory system 1000 requests an interruption of the supply voltage to the host 1300, or if the host 1300 determines to enter a sleep mode to save energy, the host 1300 may generate and transmit the Power Off Notification (PON). If the meta data manger 1250 receives the PON, the meta data manager 1250 may program the meta log in the meta data region 1111 of the memory device 1100. The meta log may be generated by changing the initial mapping information stored in RAM. The meta data manager 1250 may additionally program the meta log in the meta data region 1111, regardless of whether the PON is received.

For example, if the meta data manager 1250 receives the PON, the meta data manager 1250 may program the meta log stored in the RAM 1240 in the meta main part of the meta data region. The meta data manager 1250 may program the meta index corresponding to the meta log stored in the main meta part in the meta spare part, such that the meta data manager 1250 may recover quickly the meta data, after receiving the PON, when the supply voltage is providing a power-on or power-up operation.

The meta data manager 1250 may program the meta log in the meta main part that is generated when the first user data is programmed in PA "100". The meta data manager 1250 may program the meta index "1" including LA "1" in the meta spare part. The meta log may include information that data corresponding to LA "1" is programmed in the PA "100". Unchanged initial mapping information included in the meta index "1" may be programmed with the changed mapping information, as the meta log. For example, the meta index "1" may include mapping information of LA "1" to LA "N". If the PA corresponding LA "1" is changed and the new meta log is generated, the mapping information from LA 2 to LA N may be initial mapping information.

If the initial mode is performed by providing the supply voltage to the memory system, the memory controller 1200 may recover the mapping table stored in the RAM 1240 based on the meta log of the meta data region.

FIG. 13 and FIG. 14 are diagrams illustrating that the memory controller 1200 and the meta data manager 1250 generate the meta log and update the meta log in the meta data region. The meta data manager 1250 may selectively the perform operations described in FIG. 13 and FIG. 14 according to the state of the memory system 1000.

If pages to scan for recovering the mapping table are few after the power-up operation, the meta data manager 1250 may recover the mapping table by scanning the spare part of data region without updating the met log, as described with respect to FIG. 13.

If pages to scan for recovering the mapping table are a lot after the power-up operation, the meta data manager 1250 may program the meta log in the meta data region 1111 and recover the mapping table by reading the meta log without scanning the spare part of the user data region 1112, like described in FIG. 14.

FIG. 15 is a concept diagram illustrating that the SPO has occurred repeatedly at the memory system.

Referring to FIG. 15, for concise description, it is assumed that SPO has occurred repeatedly after one page of the memory device is programmed. A page of PA "100" of the user data region 1112 may be programmed with the first data. If SPO has occurred after programming of the first data, the meta data manager 1250 may store the generated first meta log in the first page of the meta data region. And the meta data manager 1250 may store the PON receiving signal in the second page of the meta data region 1111.

Thereafter, the supply voltage is provided, and the second user data is programmed in the PA 101 page. After the second data programming, if SPO has occurred again, the meta data manager 1250 may store the generated second meta log in the third page of the meta data region. And the meta data manager 1250 may store the PON receiving signal in the fourth page of the meta data region 1111.

Thereafter, the supply voltage is provided, and the third user data is programmed in the PA 102 page. After the third data programming, if SPO has occurred again, the meta data manager 1250 may store the generated third meta log in the fifth page of the meta data region. And the meta data manager 1250 may store the PON receiving signal in the sixth page of the meta data region 1111.

As described above, if SPO has occurred repeatedly after one page of the memory device is programmed, during a power off operation, two pages are programmed in the meta data region 1111. One of the pages is for storing the meta log and the other page is for storing the PON receiving signal. By so programming two pages of the meta data region for one page programming of the user data region 1112, the life time of the meta data region is reduced rapidly such that the meta data manger 1250 may selectively use the updating method of the meta log, described in FIG. 13 and FIG. 14.

Figure 16:
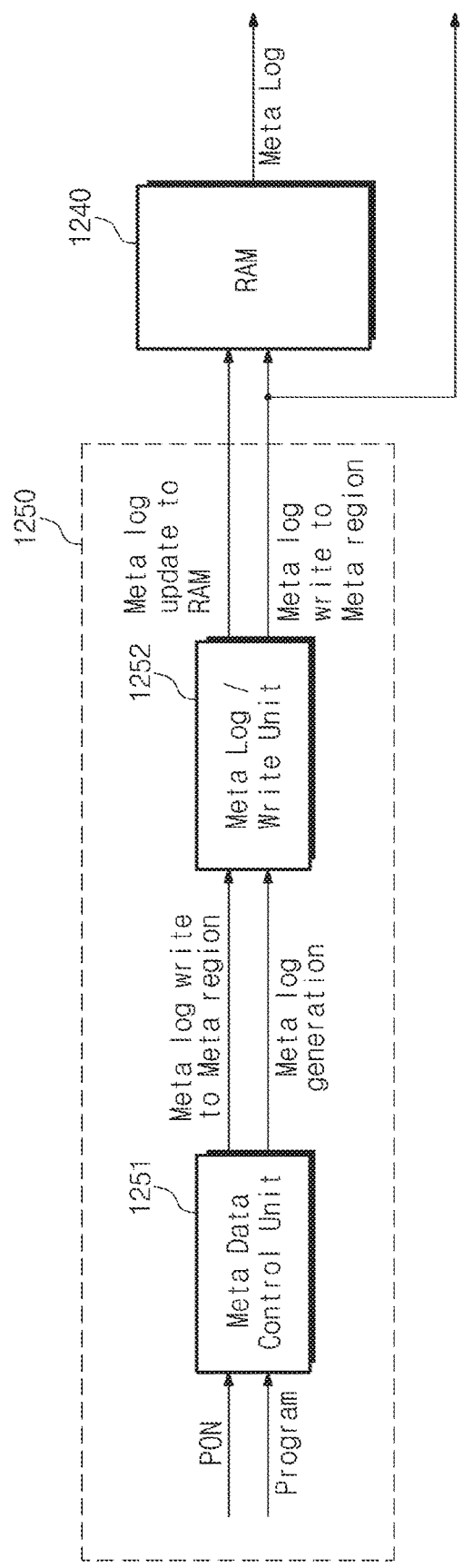
FIG. 16 is a block diagram illustrating the meta data manager of FIG. 1.

FIG. 16 is a block diagram illustrating the meta data manager of FIG. 1. Referring to FIG. 16, the meta data manager 1250 may include a meta data control unit 1251 and a meta log write unit 1252.

The meta data control unit 1251 may receive the program command. If the meta data control unit 1251 receives the program command, the meta data control unit 1241 may generate the meta log and transmit the meta log to the meta log write unit 1252. The meta log may include the PA which is programmed with the data of the program command, and the LA corresponding to the PA.

The meta data control unit 1251 may receive the PON signal indicating an interruption of the supply voltage. If the meta data control unit receives the PON, the meta data control unit 1251 may generate an instruction to update the meta data region 1111 by programming the meta log. The meta data control unit 1251 may transmit the instruction to the meta log write unit 1252 to program the meta log in the meta data region 1111.

If the meta log write unit 1252 receives the generated meta log from the meta data control unit 1251, the meta log write unit 1252 may store the received meta log in the RAM 1240 of the memory controller 1200. If the meta log write unit 1252 receives the instruction from the meta data control unit 1251 to store the meta log in the meta data region 1111, the meta log write unit 1251 may read the meta log stored in the RAM 1240, and program the read meta log in the meta data region 1111 of the memory device 1100.

Figure 17:
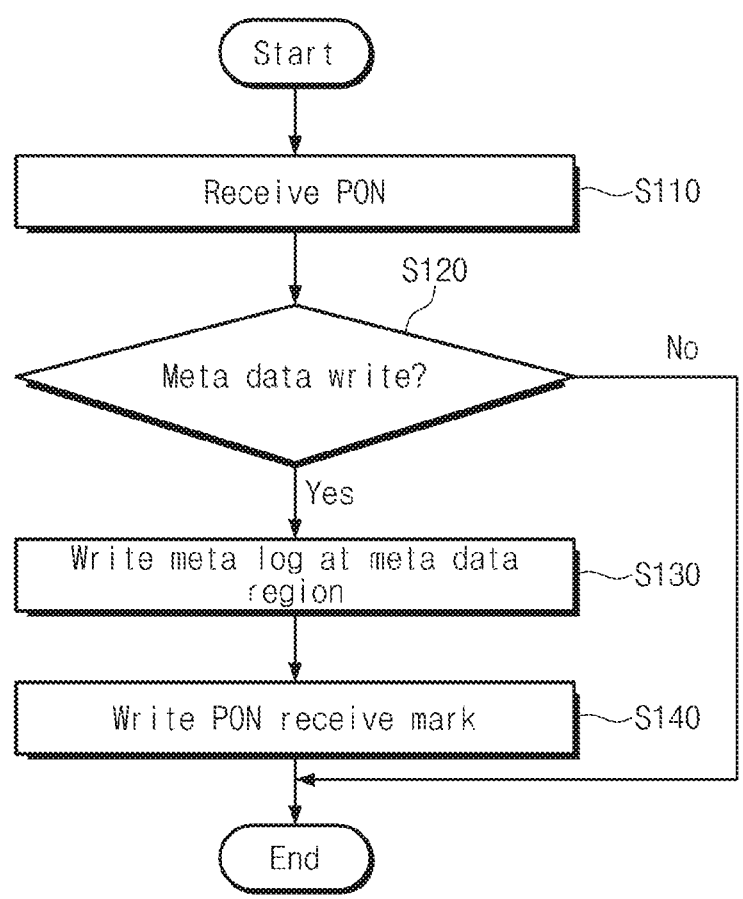
FIG. 17 is a flowchart illustrating how the meta data manager generates and stores the meta log.

FIG. 17 is a flowchart illustrating how the meta data manager generates and stores the meta log.

In step S110, the meta data manager 1250 receives the PON signal. The meta data manager 1250 may receive the PON signal from the host 1300.

In step S120, the meta data manager 1250 determines whether or not to program the meta data in the meta data region 1111. The meta data manger 1250 may determine to program the meta data based on the amount of the meta log to program in the meta data region 1111.

The meta data manager 1250 may program the meta log in the meta data region 1111 based on the number of programming operations performed on the memory device 1100. The meta data manager 1250 may program the meta log in the meta data region 1111 based on the amount of data programmed in the memory device 1100. The meta data manager 1250 may program the meta log in the meta data region 1111 based on the number of erase operations performed on the meta data region 1111.

The meta data manager 1250 may program the meta log in the meta data region 1111 based on a difference between the number of erase operations performed on the meta data region 1111 and the number of erase operations performed on the user data region. The meta data manager 1250 may program the meta log in the meta data region 1111 based on the number of PON signals received during a reference time.

In step S130, the meta data manager 1250 programs the meta log stored in the RAM 1240 in the meta data region 1111.

In step S140, the meta data manager 1250 programs the PON receiving mark in the meta data region 1111.

Figure 18:
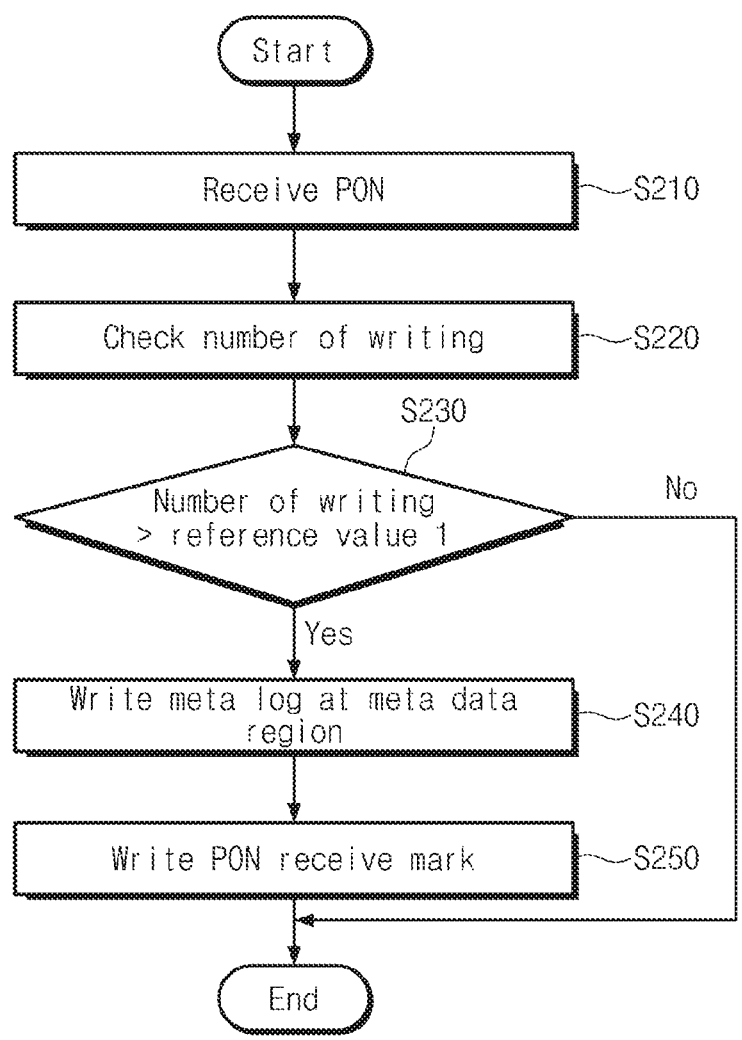
FIG. 18 is a flow chart illustrating another exemplary operation in which the meta data manager of FIG. 1 generates the meta log and selectively stores the meta log.

FIG. 18 is a flow chart illustrating another exemplary operation in which the meta data manager of FIG. 1 generates the meta log and selectively stores the meta log.

In step S210, the meta data manager 1250 receives the PON signal. The meta data manager 1250 may receive the PON signal from the host 1300.

In step S220, the meta data manager 1250 ascertains the number of programming operations performed on the memory device 1100. The number of programming operations performed is the number of program commands occurring between the time point of a last meta log storing operation to the present. The number of programming operations may be stored in the RAM 1240 of the memory controller 1200. The number of programming operations may be initialized if the meta log is stored in the memory device 1100.

In step S230, the meta data manager 1250 compares the number of programming operations with a first reference value. If the number of programming operations is greater than the first reference value, the meta data manager 1250 performs the step S240. For example, the first reference value may be 20. After a prior meta data updating operation, the meta data manager 1250 performs step S240 if the number of programming operations is greater than 20. The meta data manager 1250 terminates the process if the number of programming operations is less than or equal to the first reference value.

In step S240, the meta data manager 1250 programs (or stores) the meta log in the meta data region 1111 of the memory device 1100 which is stored in the RAM 1240.

In step S250, the meta data manager 1250 programs the PON receiving mark in the meta data region 1111. The meta data manager 1250 may program the PON receiving mark in a page adjacent to the page which stores the meta log in the meta data region 1111 in step S240.

Referring to FIG. 18, the meta data manager 1250 may determine whether or not to program the meta log, according to the number of programming operations performed on the user data region 1112. For example, the meta data manager 1250 determines that a normal amount of time is required to scan pages for recovering a mapping table after receiving a PON signal and a subsequent supply voltage, if the number of programming operations is less than or equal to the first reference value. Thus, the meta data manager 1250 may increase the life of the meta data region 1111 by decreasing the number of programming operations within the meta data region 1111.

Figure 19:
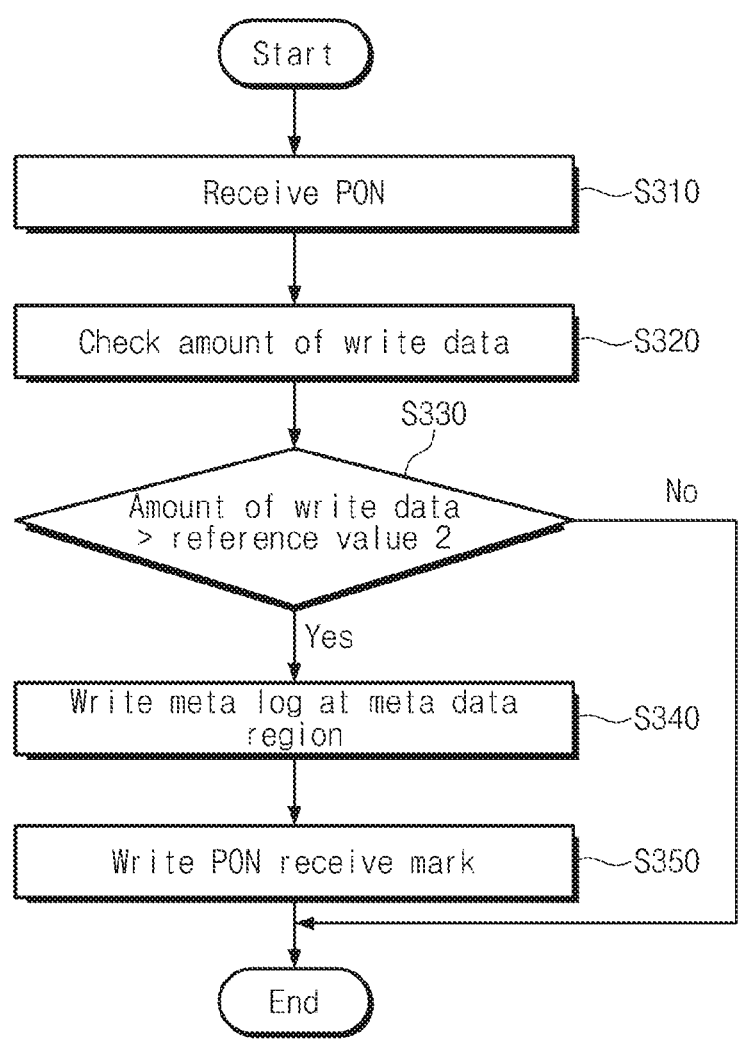
FIG. 19 a flow chart illustrating another exemplary operation in which the meta data manager of FIG. 1 generates the meta log and selectively stores the meta log.

FIG. 19 is a flow chart illustrating another exemplary operation in which the meta data manager of FIG. 1 generates a meta log and selectively stores the meta log.

In step S310, the meta data manager 1250 receives the PON signal. The meta data manager 1250 may receive the PON signal from the host 1300.

In step S320, the meta data manager 1250 ascertains the amount of program data stored in the memory device 1100. The amount of program data is that generated between the last meta log storing operation up to the present time. The amount of program data may be stored in the RAM 1240 of the memory controller 1200. The amount of program data may be re-initialized when the meta log is stored in the memory device 1100.

In step S330, the meta data manager 1250 compares the amount of program data with a second reference value. If the amount of program data is greater than the second reference value, the meta data manager 1250 performs the step S340. For example, the second reference value may be 200 kilo bytes (KB). After a prior meta data updating operation, the meta data manager 1250 performs step S340 if the amount of program data is greater than 200 KB. The meta data manager 1250 terminates the process if the amount of program data is less than or equal to the second reference value.

In step S340, the meta data manager 1250 programs (or stores) the meta log to the meta data region 1111 of the memory device 1100 which is stored in the RAM 1240.

In step S350, the meta data manager 1250 programs the PON receiving mark in the meta data region 1111. The meta data manager 1250 may program the PON receiving mark in a page adjacent to the page which stores the meta log in the meta data region 1111 in step S340.

Referring to FIG. 19, the meta data manager 1250 may determine whether or not to program the meta log, according to the amount of data programmed in the user data region 1112. If the amount of program data is less than or equal to the second reference value, after the last meta log programming, the meta data manager 1250 determines that the amount of a meta log to store is small. Therefore, the meta data manager determines that the amount of time it takes to scan the pages for recovering the mapping table after the supply voltage is resumed is short. Thus, the meta data manager may not program the meta log in the meta data region 1111. Thus, the meta data manager 1250 may increase the life of the meta data region 1111 by decreasing the number of programming operations within the meta data region 1111.

Figure 20:
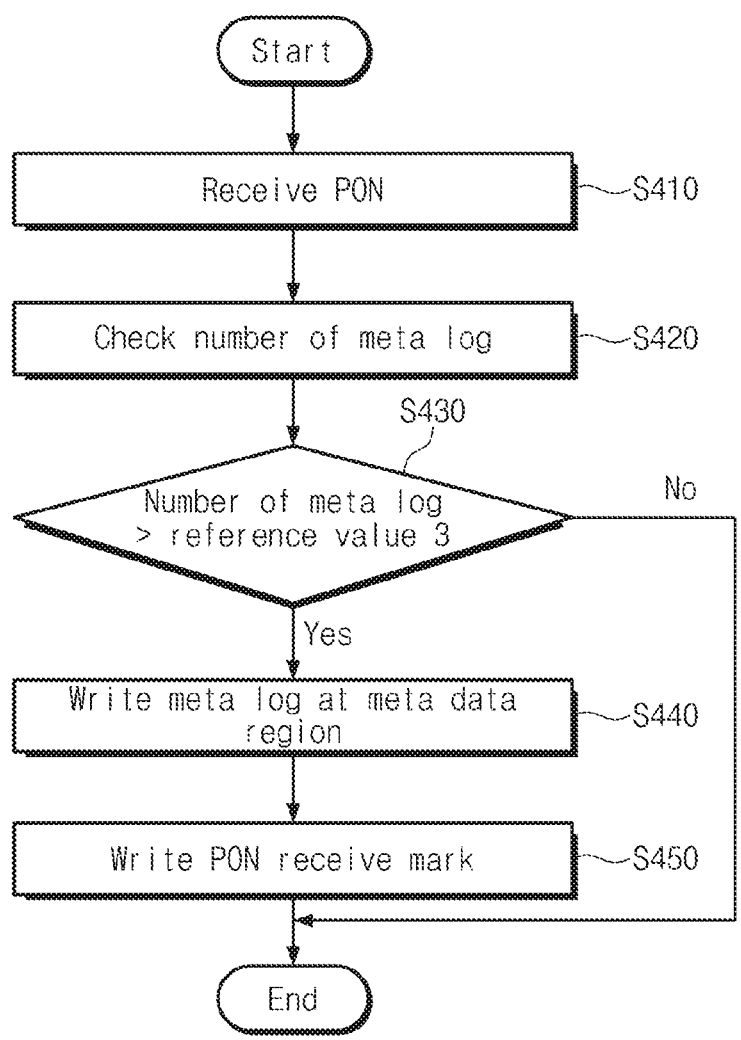
FIG. 20 a flow chart illustrating another exemplary operation in which the meta data manager of FIG. 1 generates the meta log and selectively stores the meta log.

FIG. 20 is a flow chart illustrating another exemplary operation in which the meta data manager of FIG. 1 generates the meta log and selectively stores the meta log.

In step S410, the meta data manager 1250 receives the PON signal. The meta data manager 1250 may receive the PON signal from the host 1300.

In step S420, the meta data manager 1250 ascertains the number of meta log operations. The number of meta log operations is the total number of meta log operations generated between the last meta log storing operation up to the present time. The number of meta log operations may be stored in the RAM 1240 of the memory controller 1200. The amount of changed meta log operations may be re-initialized if the meta log is stored in the memory device 1100.

In step S430, the meta data manager 1250 compares the number of meta log operations with the third reference value. If the number of meta log operations is greater than the third reference value, the meta data manager 1250 performs the step S440. For example, the third reference value may be 20. After a prior meta data updating operation, the meta data manager 1250 performs step S440 if the number of meta log operations is greater than 20. The meta data manager 1250 terminates the process if the number of meta log operations is less than or equal to the third reference value without storing the meta log in the meta data region 1111.

In step S440, the meta data manager 1250 programs (or stores) the meta log in the meta data region 1111 of the memory device 1100 which is stored in the RAM 1240.

In step S450, the meta data manager 1250 programs the PON receiving mark in the meta data region 1111. The meta data manager 1250 may program the PON receiving mark in a page adjacent to the page which stores the meta log in the meta data region 1111 in step S440.

Referring to FIG. 20, the meta data manager 1250 may determine whether or not to program the meta log, according to the number of meta log operations generated after the last meta log storing operation. If the number of meta log operations is less than or equal to the third reference value, after the last meta log programming operation, the meta data manager 1250 determines that the amount of meta log operations to store is small. Therefore, the meta data manager determines that the amount of time it takes to scan the pages for recovering the mapping table after the supply voltage is resumed is short. Thus, the meta data manager may not program the meta log in the meta data region 1111. The meta data manager 1250 may reduce the wear-out phenomenon of the meta data region 1111 by decreasing the number of programming operations within the meta data region 1111.

Figure 21:
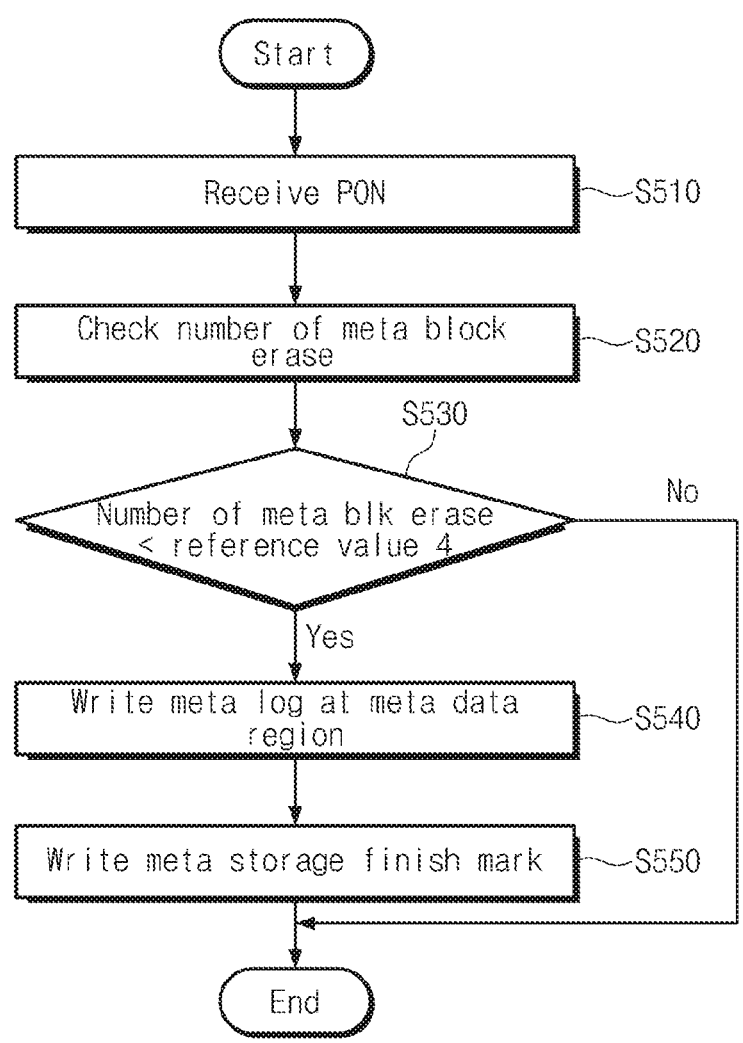
FIG. 21 a flow chart illustrating another exemplary operation in which the meta data manager of FIG. 1 generates the meta log and selectively stores the meta log.

FIG. 21 a flow chart illustrating another exemplary operation in which the meta data manager of FIG. 1 generates the meta log and selectively stores the meta log.

In step S510, the meta data manager 1250 receives the PON signal. The meta data manager 1250 may receive the PON signal from the host 1300.

In step S520, the meta data manager 1250 ascertains the number of erase operations performed on the meta data region. The meta data region may include a plurality of memory blocks. The number of erase operations of the meta data region is an average value of the number or erase operations of the memory blocks of the meta data region. The number of erase operations of the meta data region may be the number of erase operations of a specific memory block included in the meta data region. The number of erase operations of the meta data region may be the total number of erase operations of the plurality of memory blocks included in the meta data region.

In step S530, the meta data manager 1250 compares the number of erase operations of the meta data region with a fourth reference value. If the number of erase operations of the meta data region is less than the fourth reference value, the meta data manager 1250 performs the step S540. For example, the fourth reference value may be 1000. The meta data manager 1250 performs step S540 if the number of erase operations of the meta data region is less than 1000. The meta data manager 1250 terminates the process if the number of erase operations of the meta data region is greater than or equal to the fourth reference value, without storing the meta log in the meta data region 1111.

In step S540, the meta data manager 1250 programs (or stores) the meta log in the meta data region 1111 of the memory device 1100 which is stored in the RAM 1240.

In step S550, the meta data manager 1250 programs the PON receiving mark in the meta data region 1111. The meta data manager 1250 may program the PON receiving mark in a page adjacent to the page which stores the meta log in the meta data region 1111 in step S540.

Referring to FIG. 21, the meta data manager 1250 may determine whether or not to program the meta log, according to the number of erase operations of the meta data region. If the number of erase operations of the meta data region is greater than or equal to the fourth reference value, the meta data manager 1250 determines that the meta data region 1111 becomes depleted. Thus, the meta data manager may not program the meta log in the meta data region 1111, so as to increase the life of the meta data region 1111. The meta data manager 1250 may reduce the wear-out phenomenon of the meta data region 1111 by decreasing the number of programming operations within the meta data region 1111.

Figure 22:
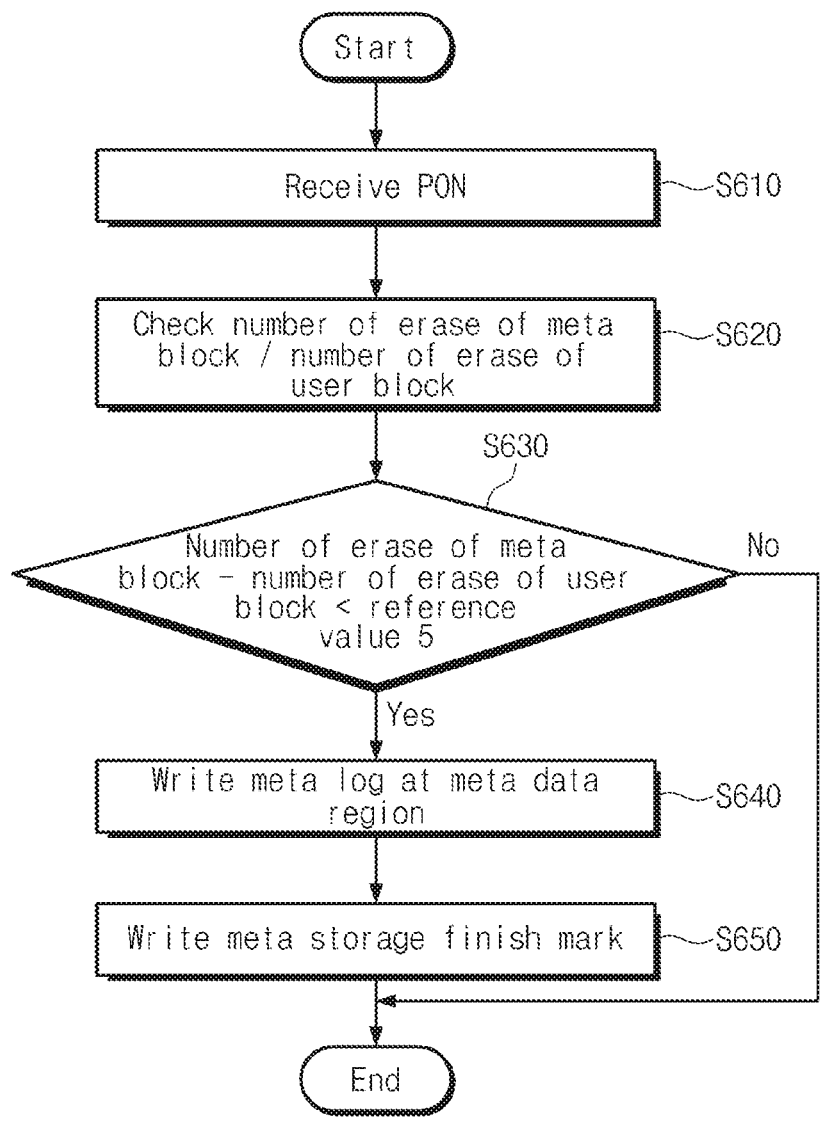
FIG. 22 a flow chart illustrating another exemplary operation in which the meta data manager of FIG. 1 generates the meta log and selectively stores the meta log.

FIG. 22 a flow chart illustrating another exemplary operation in which the meta data manager of FIG. 1 generates the meta log and selectively stores the meta log.

In step S610, the meta data manager 1250 receives the PON signal. The meta data manager 1250 may receive the PON signal from the host 1300.

In step S620, the meta data manager 1250 ascertains the number of erase operations performed on the meta data region and the number of erase operations of the user data region. The explanation of the number of erase operations of the meta data region is the same as that provided with respect to FIG. 21. Thus, a repeated explanation is omitted.

The user data region 1112 may include a plurality of memory blocks. The number of erase operations of the user data region 1112 is an average value of the number of erase operations of the memory blocks of the user data region. The number of erase operations of the user data region may be the number of erase operations of a specific memory block included in the user data region. The number of erase operations of the user data region may be the total number of erase operations of the plurality of memory blocks included in the user data region.

In step S630, the meta data manager 1250 determines the difference value between the number of erase operations of the meta data region 1111 and the number of erase operations of the user data region 1112. The meta data manager 1250 compares the difference value with a fifth reference value. If the difference value is less than the fifth reference value, the meta data manager 1250 performs the step S640. For example, the fifth reference value may be 100. The meta data manager 1250 performs step S640 if the difference value is less than 100. The meta data manager 1250 terminates the process if the difference value is greater than or equal to the fifth reference value, without storing the meta log in the meta data region 1111.

In step S640, the meta data manager 1250 programs (or stores) the meta log in the meta data region 1111 of the memory device 1100 which is stored in the RAM 1240.

In step S650, the meta data manager 1250 programs the PON receiving mark in the meta data region 1111. The meta data manager 1250 may program the PON receiving mark in a page adjacent to the page which stores the meta log in the meta data region 1111 in step S640.

Referring to FIG. 22, the meta data manager 1250 may determine whether or not to program the meta log, according to the difference value. If the difference value is greater than or equal to the fifth reference value, the meta data manager 1250 determines that the meta data region 1111 is becoming more depleted than the user data region 1112. Thus, the meta data manager may not program the meta log in the meta data region 1111, so as to increase the life of the meta data region 1111. The meta data manager 1250 may reduce the wear-out phenomenon of the meta data region 1111 by decreasing the number of programming operations within the meta data region 1111.

Figure 23:
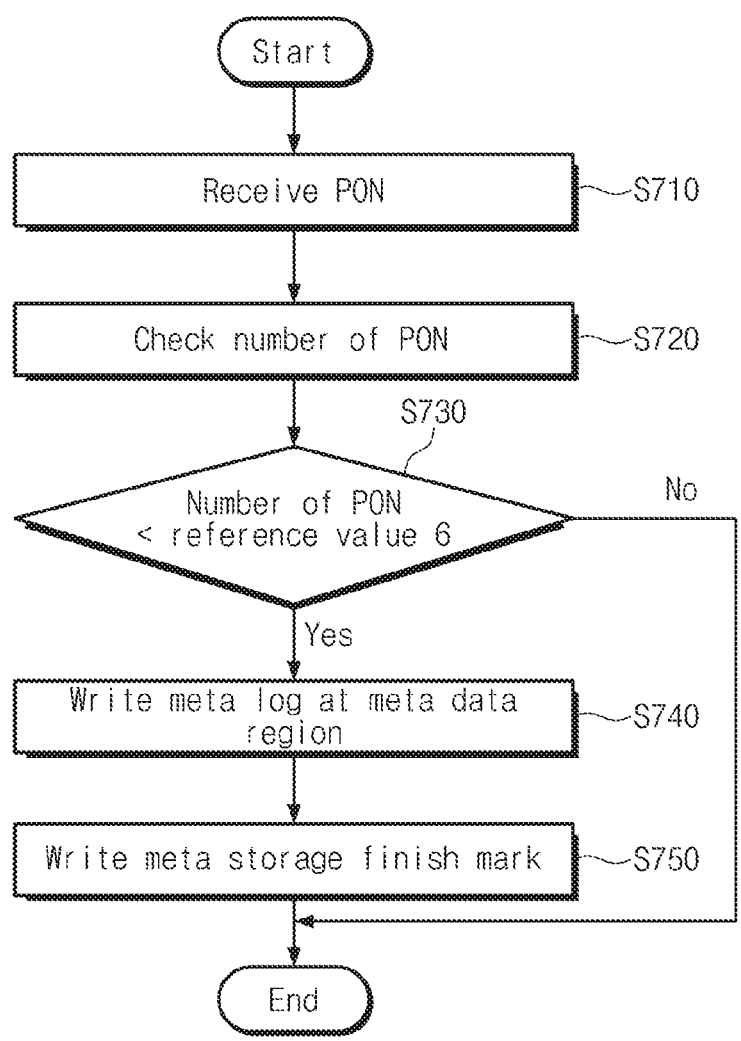
FIG. 23 a flow chart illustrating another exemplary operation in which the meta data manager of FIG. 1 generates the meta log and selectively stores the meta log.

FIG. 23 a flow chart illustrating another exemplary operation in which the meta data manager of FIG. 1 generates the meta log and selectively stores the meta log.

In step S710, the meta data manager 1250 receives the PON signal. The meta data manager 1250 may receive the PON signal from the host 1300.

In step S720, the meta data manager 1250 determines the number of received PON signals for a length of time.

In step S730, The meta data manager 1250 compares the number of received PON signals with a sixth reference value. If the number of received PON signals is less than the sixth reference value, the meta data manager 1250 performs the step S740. For example, the sixth reference value may be 50. The meta data manager 1250 performs step S740 if the number of received PON signals, after the last meta data storing operation, is less than 50. The meta data manager 1250 terminates the process if the number of received PON signals is greater than or equal to the sixth reference value, without storing the meta log in the meta data region 1111.

In step S740, the meta data manager 1250 programs (or stores) the meta log in the meta data region 1111 of the memory device 1100 which is stored in the RAM 1240.

In step S750, the meta data manager 1250 programs the PON receiving mark in the meta data region 1111. The meta data manager 1250 may program the PON receiving mark in a page adjacent to the page which stores the meta log in the meta data region 1111 in step S740.

Referring to FIG. 23, the meta data manager 1250 may determine whether or not to program the meta log, according to the number of received PON signals. If the number of received PON signals is greater than or equal to the sixth reference value, the meta data manager 1250 determines that the memory system 1000 is not working normally. Thus, the meta data manager may not program the meta log which is generated in an abnormal state. The meta data manager 1250 may reduce the wear-out phenomenon of the meta data region 1111 by decreasing the number of programming operations within the meta data region 1111.

III. Example Embodiment

Figure 24:
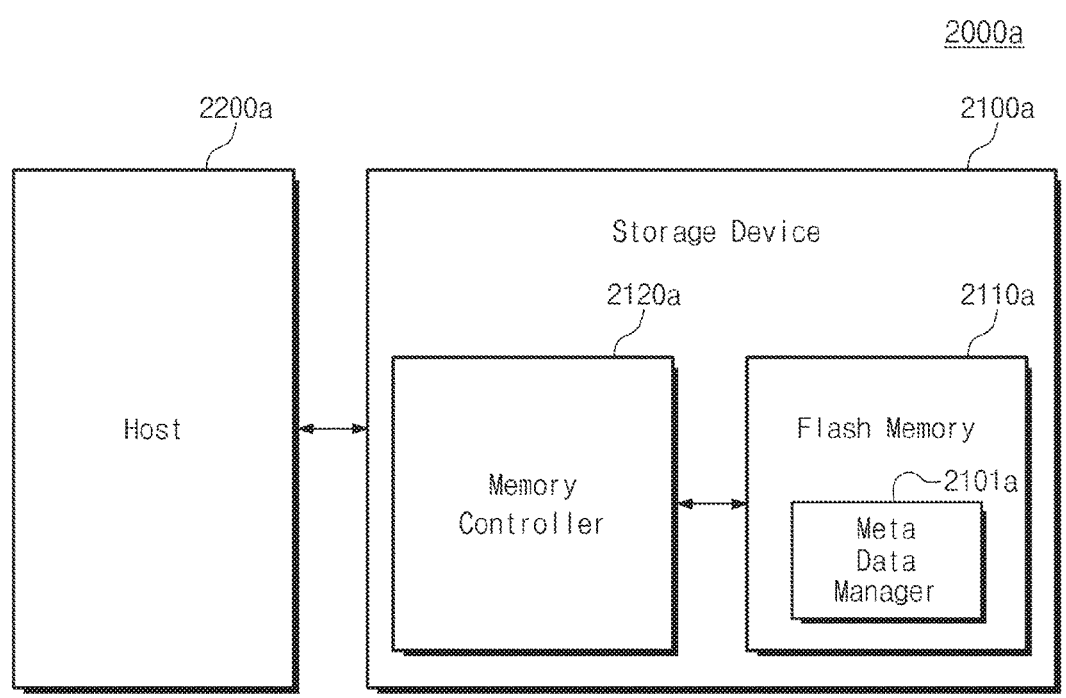
FIG. 24 and FIG. 25 are block diagrams respectively illustrating example applications of a memory system according to at least one example embodiment of the disclosure.
Figure 25:
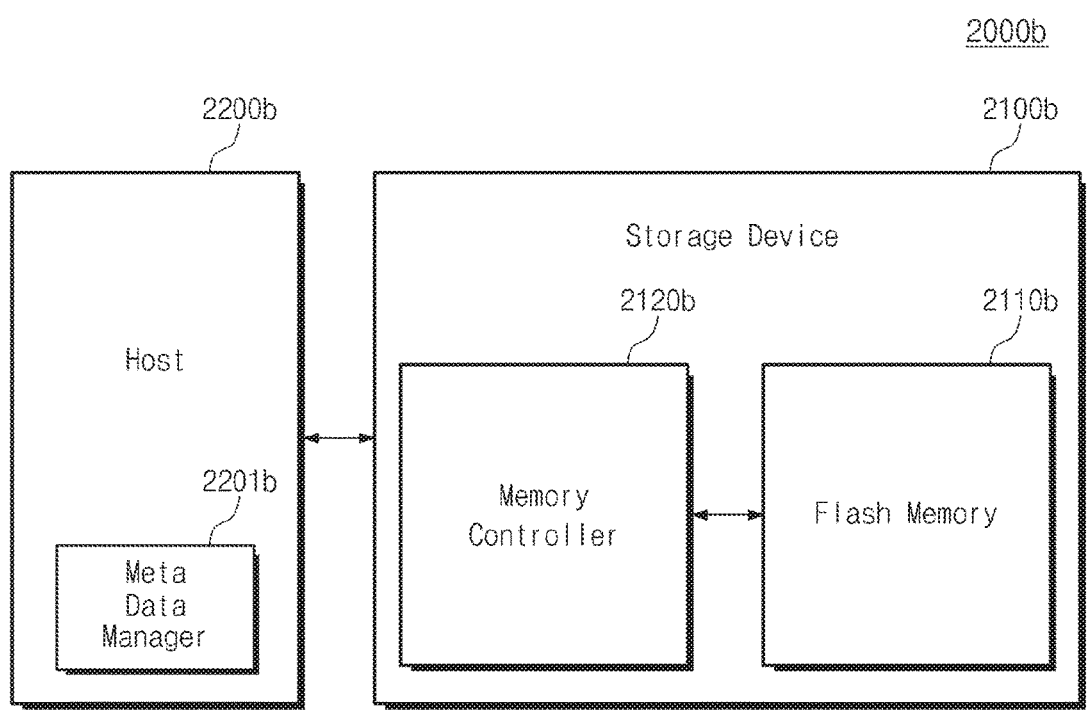

FIG. 24 and FIG. 25 are block diagrams respectively illustrating example applications of a memory system according to at least one example embodiment of the disclosure. Referring to FIGS. 24 and 25, a memory system 2000a, 2000b comprises a storage device 2100a, 2100b, and a host 2200a, 2200b. The storage device 2100a, 2100b may include a flash memory 2110a, 2110b and a memory controller 2120a, 2120b.

The storage device 2100a, 2100b may include a non-transitory storage medium such as a memory card (e.g., SD, MMC, etc.) or an attachable handheld storage device (e.g., an USB memory). The storage device 2100a, 2100b may be connected with the host 2200a, 2200b. The storage device 2100a, 2100b may transmit and receive data to and from the host via a host interface. The storage device 2100a, 2100b may be supplied with power from the host 2200a, 2200b.

Referring to FIG. 24, a meta data manager 2101a may be included in a flash memory 2110a, and referring to FIG. 25, a meta data manager 2201b may be included in the host 2200b. According to one or more example embodiments of the disclosure, the meta data manager 2101a and 2201b may have the same operation and/or structure as that meta data manager 1250 described above with reference to FIGS. 1-23. Memory systems 2000a, 2000b according to at least some embodiments of the disclosure may selectively store the meta log such that the meta data manager may improve the life of the memory device and reduce the wear-out phenomenon using the meta data manager 2101a, 2201b.

Figure 26:
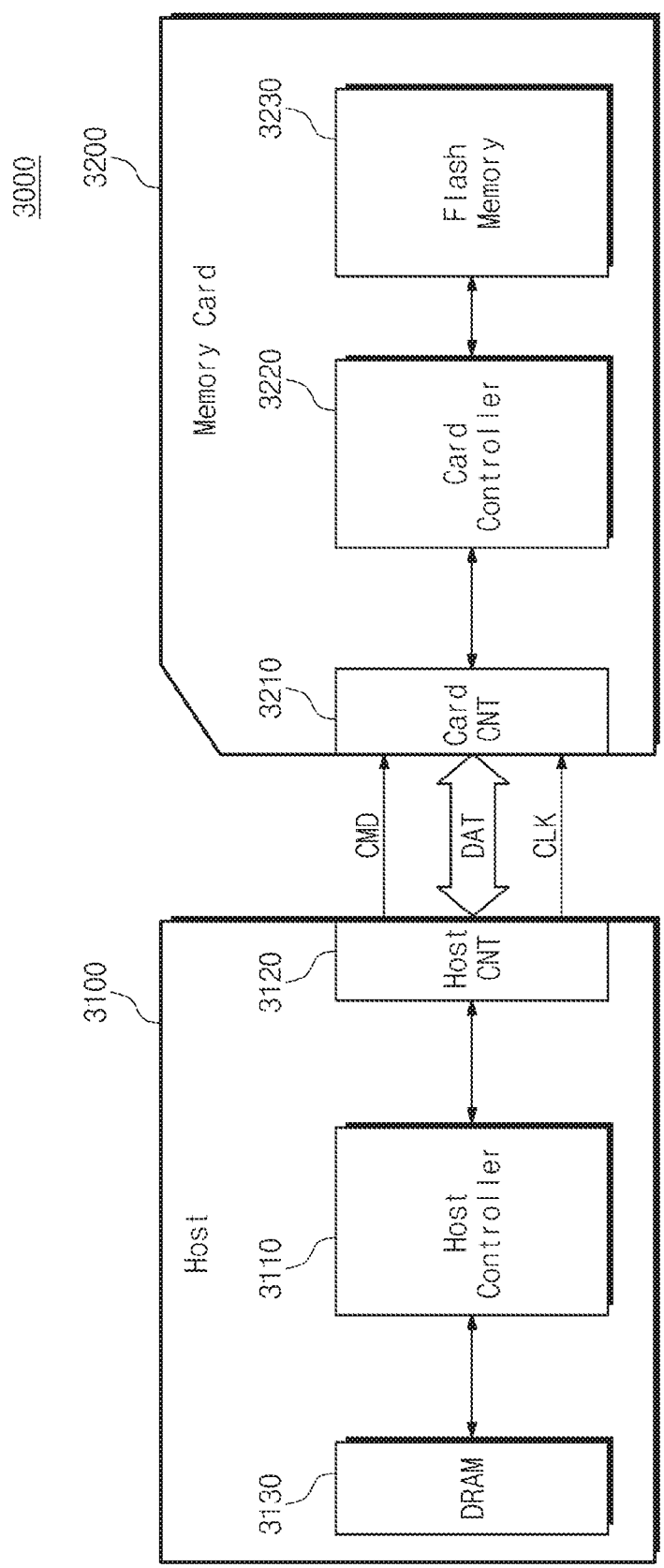
FIG. 26 is a block diagram illustrating a memory card system that may incorporate a memory system according to at least one example embodiment of the disclosure.

FIG. 26 is a block diagram illustrating a memory card system 3000 that may incorporate a memory system according to at least one example embodiment of the disclosure. The memory card system 3000 includes a host 3100 and a memory card 3200. The host 3100 includes a host controller 3110, a host connection unit 3120, and a DRAM 3130. According to one or more example embodiments of the disclosure, at least one of the host 3100 and the memory card 3200 may include a meta data manager having the same operation and/or structure as the meta data manager 1250 described above with reference to FIGS. 1-23.

The host 3100 may write data in the memory card 3200 and read data from the memory card 3200. The host controller 3100 may send a command (e.g., a write command), a clock signal CLK generated by a clock generator (not shown), and corresponding write data to the memory card 3200 via the host connection unit 3120. The DRAM 3130 may be used as a main memory by the host 3100.

The memory card 3200 may include a card connection unit 3210, a card controller 3220, and a flash memory 3230. The card controller 3220 may store data in the flash memory 3230 in response to a command input via the card connection unit 3210. The data may be stored synchronously with respect to the clock signal generated by a clock generator (not shown) in the card controller 3220. The flash memory 3230 may store data transferred from the host 3100. For example, in a case where the host 3100 is a digital camera, the flash memory 3230 may store image data.

The memory card system 3000 illustrated in FIG. 26 may include a garbage collection unit in the host controller 3100, card controller 3220, or the flash memory 3230. As described above, at least some embodiments of the disclosure including the meta data manager may improve the life of the memory device and reduce the wear-out phenomenon using the meta data manager.

Figure 27:
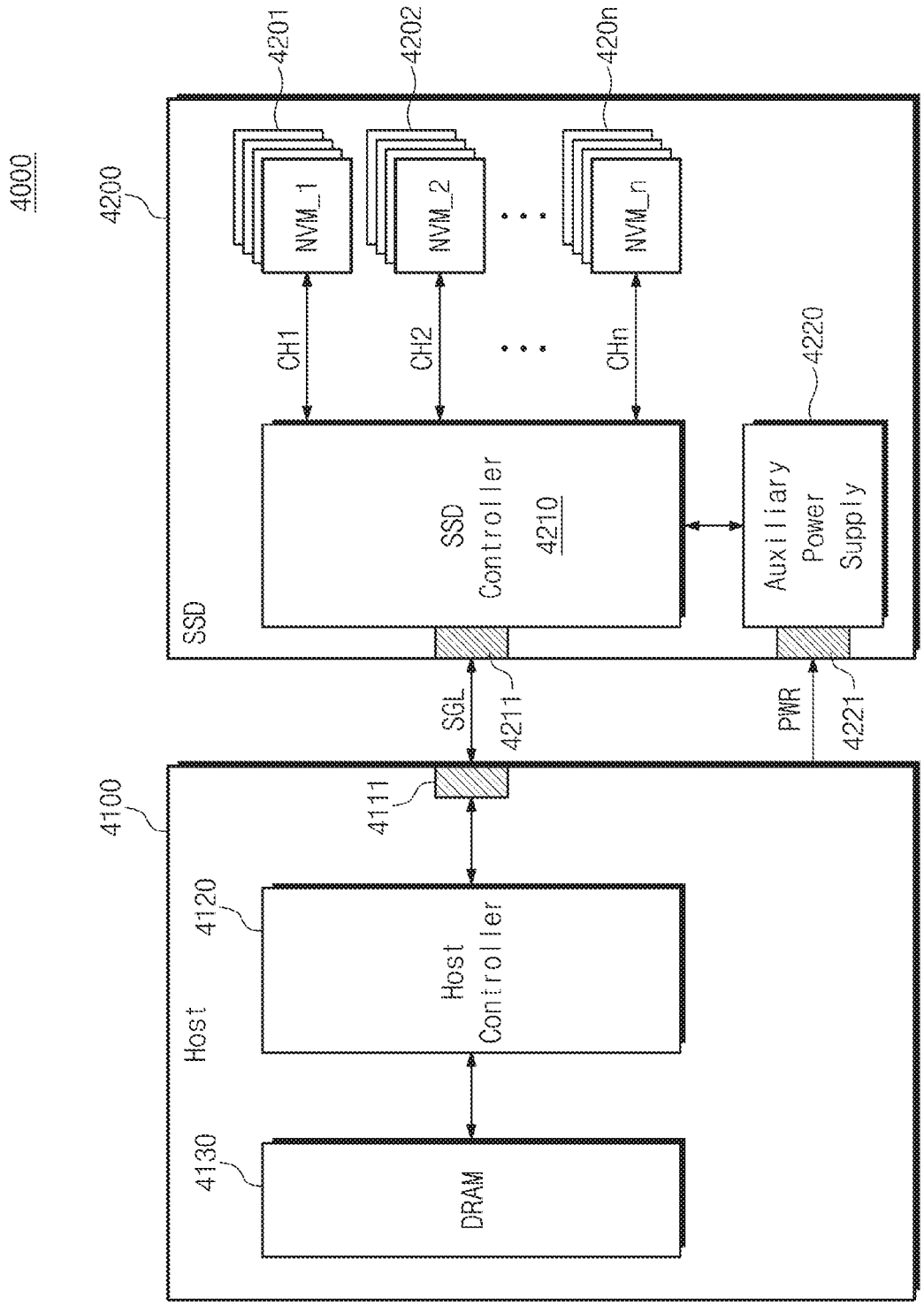
FIG. 27 is a block diagram illustrating a solid state drive (SSD) system including a memory system according to at least one example embodiment of the disclosure.

FIG. 27 is a block diagram illustrating a solid state drive (SSD) system including a memory system according to at least one example embodiment of the disclosure. Referring to FIG. 27, an SSD system 4000 generally includes a host 4100, and an SSD 4200. The host 4100 includes a host interface 4111, a host controller 4120, and a DRAM 4130.

According to one or more example embodiments of the disclosure, at least one of the host 4100 and the SSD 4200 may include a garbage collection unit having the same operation and/or structure as the meta data manager 1250 described above with reference to FIGS. 1-23.

The host 4100 may be used to write data in the SSD 4200, and to read data from the SSD 4200. The host controller 4120 may be used to transfer signals (SGL) such as commands, addresses, and/or control signals to the SSD 4200 via the host interface 4111. The DRAM 4130 may be used as a main memory of the host 4100.

The SSD 4200 may be configured to exchange signals SGL with the host 4100 via the host interface 4211, and may also be configured to receive power PWR via a power connector 4221. The SSD 4200 includes a plurality of nonvolatile memories 4201 to 420n, an SSD controller 4210, and an auxiliary power supply 4220. Herein, the nonvolatile memories 4201 to 420n may be implemented using one or more flash memory devices and also PRAM, MRAM, ReRAM, etc.

The plurality of nonvolatile memories 4201 to 420n may be used as the storage medium of SSD 4200. The plurality of nonvolatile memories 4201 to 420n may be connected with the SSD controller 4210 via a plurality of channels, CH1 to CHn. One channel may be connected with one or more nonvolatile memories. Nonvolatile memories connected with one channel may be connected with the same data bus.

The SSD controller 4210 may exchange signals SGL with the host 4100 via the host interface 4211. Herein, the signals SGL may include a command, an address, data, and the like. The SSD controller 4210 may be configured to write or read out data to or from a corresponding nonvolatile memory according to a command of the host 4100. The SSD controller 4210 will be more fully described with reference to FIG. 28.

The auxiliary power supply 4220 may be connected with the host 4100 via the power connector 4221. The auxiliary power supply 4220 may be charged by power PWR from the host 4100. The auxiliary power supply 4220 may be placed within the SSD 4200 or outside the SSD. For example, the auxiliary power supply 4220 may be disposed on a main board to supply auxiliary power to the SSD 4200.

Figure 28:
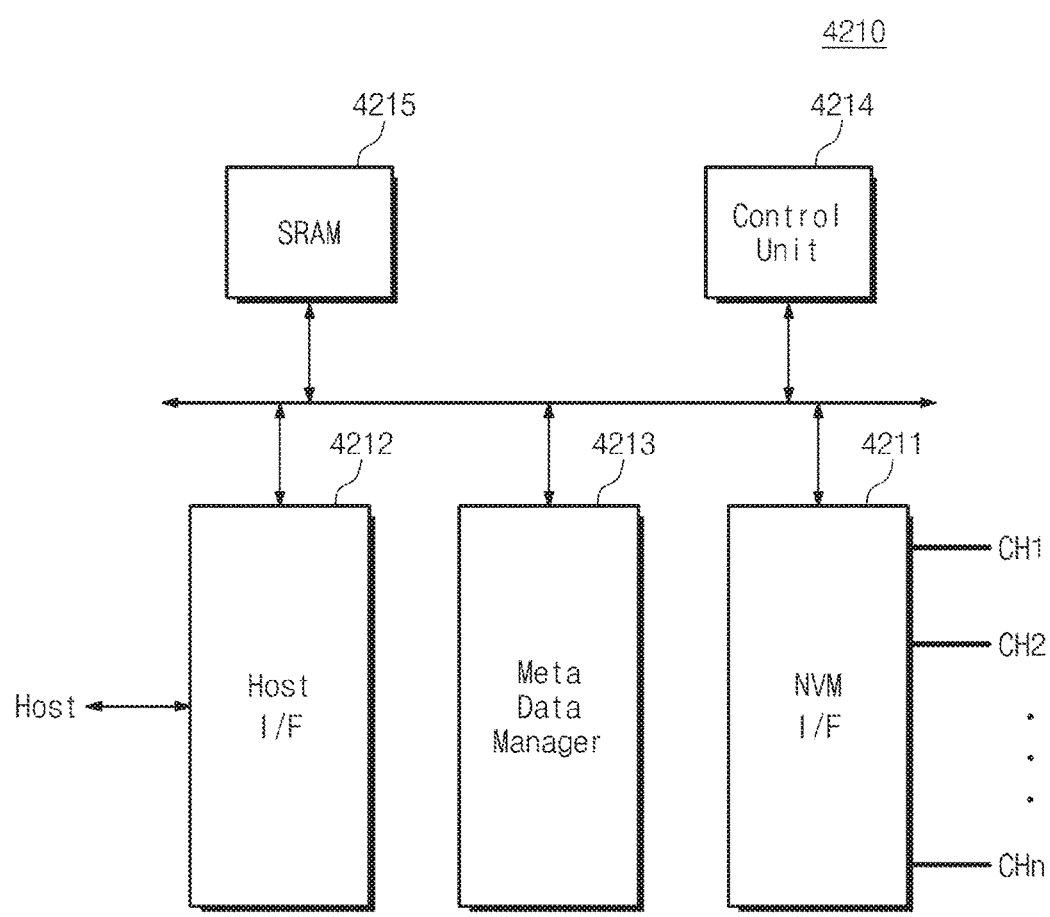
FIG. 28 is a block diagram further illustrating the SSD controller of FIG. 27.

FIG. 28 is a block diagram further illustrating the SSD controller 4210 of FIG. 27. Referring to FIG. 28, the SSD controller 4210 comprises a nonvolatile memory (NVM) interface 4211, a host interface 4212, a meta data manager 4213, control unit 4214, and an SRAM 4215. According to one or more example embodiments of the disclosure, the meta data manger 4213 may have the same operation and/or structure as the meta data manager 1250 described above with reference to FIGS. 1-23.

The NVM interface 4211 may scatter data transferred from a main memory of a host 4100 to channels CH1 to CHn, respectively. The NVM interface 4211 may transfer data read from nonvolatile memories 4201 to 420n to the host 4100 via the host interface 4212.

The host interface 4212 may provide an interface with an SSD 4200 according to the protocol of the host 4100. The host interface 4212 may communicate with the host 4100 suing USB, SCSI, PCI, PCI-E, ATA, parallel ATA, serial ATA, SAS, etc. The host interface 4212 may perform a disk emulation function which enables the host 4100 to recognize the SSD 4200 as a hard disk drive (HDD).

The meta data manager 4213 may be used to manage the meta log storing operation in relation to the nonvolatile memories 4201 to 420n, as described above. The control unit 4214 may be used to analyze and process signals SGL input from the host 4100. The control unit 4214 may be used to control the host 4100 via the host interface 4212 or the nonvolatile memories 4201 to 420n via the NVM interface 4211. The control unit 4214 may control the nonvolatile memories 4201 to 420n using firmware that drives at least in part the operation of SSD 4200.

The SRAM 4215 may be used to drive software which efficiently manages the nonvolatile memories 4201 to 420n. The SRAM 4215 may store metadata input from a main memory of the host 4100 or cache data. At a sudden power-off operation, metadata or cache data stored in the SRAM 4215 may be stored in the nonvolatile memories 4201 to 420n using the auxiliary power supply 4220.

Returning to FIG. 28, the SSD system 4000 incorporating techniques consistent with at least some example embodiments of the disclosure may improve the life of the memory device and reduce the wear-out phenomenon using the meta data manager of the memory system as described above.

Figure 29:
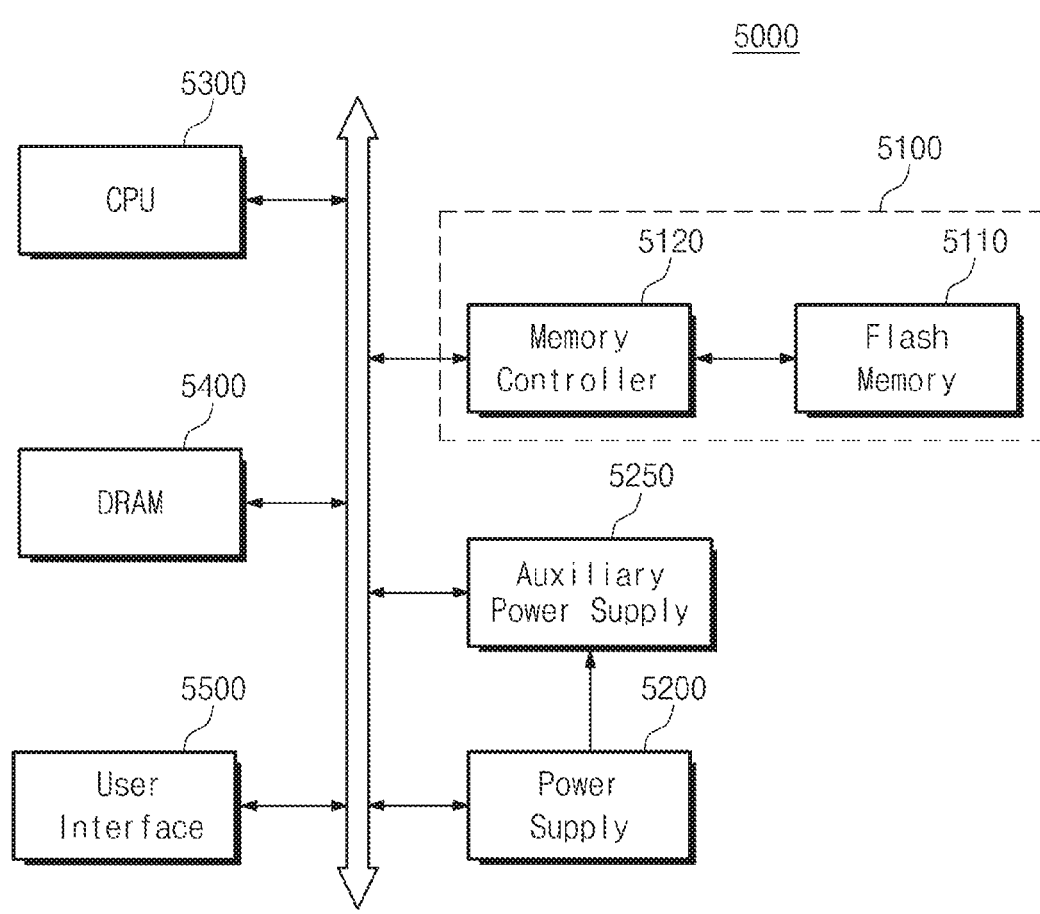
FIG. 29 is a block diagram illustrating an electronic device that may incorporate a memory system according to at least one example embodiment of the disclosure.

FIG. 29 is a block diagram illustrating an electronic device that may incorporate a memory system according to at least one example embodiment of the disclosure. Herein, an electronic device 5000 may be a personal computer (PC) handheld electronic device such as a notebook computer, a cellular phone, a personal digital assistant (PDA), a digital camera, etc.

Referring to FIG. 29, the electronic device 5000 generally comprises a memory system 5100, a power supply device 5200, an auxiliary power supply 5250, a central processing unit (CPU) 5300, a DRAM 5400, and a user interface 5500. The memory system 5100 may be embedded within the electronic device 5000 and include a flash memory 5110 and a memory controller 5120. According to one or more example embodiments of the disclosure, the memory system 5100 may include a meta data manager having the same operation and/or structure as the meta data manager 1250 described above with reference to FIGS. 1-23.

As described above, by incorporating a memory system according to at least one example embodiment of the disclosure, the electronic device 5000 may improve the life of the memory device and reduce the wear-out phenomenon using the meta data manager.

Example embodiments of the disclosure having thus been described, it will be obvious that the same may be varied in many ways. Such variations are not to be regarded as a departure from the intended spirit and scope of example embodiments of the disclosure, and all such modifications as would be obvious to one skilled in the art are intended to be included within the scope of the following claims.

What is claimed is:

1. A method of operating a memory system including a nonvolatile memory, including a meta data region and a user data region, and a memory controller including a meta data manager, the method comprising:
    programming data to a memory block of the user data region;
    by operation of the meta data manager, generating a meta log based on the programming, and storing the meta log to the memory controller; and
    upon a power-off operation, selectively storing the meta log to the meta data region of the nonvolatile memory based on status information of the nonvolatile memory, wherein:
    the memory block comprises a plurality of pages, a page of the plurality of pages comprises a main part and a spare part, the data is stored at the main part, and a logical address corresponding to a physical address of the memory block storing the data is stored at the spare part, and wherein: the meta data region comprises a meta page, the meta page comprises a meta main part and a meta spare part, mapping information is stored at the meta main part of the meta page, and a meta index is stored at the meta spare part.

2. The method of claim 1, wherein:
the status information of the nonvolatile memory is a number of performed programming operations to the memory block after a last meta log storing operation,
the meta data manager, in response to determining that the number of performed programming operations is greater than a reference value, stores the meta log to the meta data region of the nonvolatile memory, and
in response to determining that the number of performed programming operations is less than or equal to the reference value, the meta data manager does not store the meta log to the meta data region of the nonvolatile memory.

3. The method of claim 1, wherein:
the status information of the nonvolatile memory is an amount of data programmed to the memory block after a last meta log storing operation,
the meta data manager, in response to determining that the amount of programmed data is greater than a reference value, stores the meta log to the meta data region of the nonvolatile memory, and
in response to determining that the amount of programmed data is less than or equal to the reference value, the meta data manager does not store the meta log to the meta data region of the nonvolatile memory.

4. The method of claim 1, wherein:
the status information of the nonvolatile memory is a number of meta log operations generated after a last meta log storing operation,
the meta data manager, in response to determining that the number of meta log operations is greater than a reference value, stores the meta log to the meta data region of the nonvolatile memory, and
in response to determining that the number of meta log is less than or equal to the reference value, the meta data manager does not store the meta log to the meta data region of the nonvolatile memory.

5. The method claim of 1, wherein:
the status information of the nonvolatile memory is a number of erase operations of the meta data region,
the meta data manager, in response to determining that the number of erase operations of the meta data region is less than a reference value, stores the meta log to the meta data region of the nonvolatile memory, and
in response to determining that the number of erase operations of meta data region is greater than or equal to the reference value, the meta data manager does not store the meta log to the meta data region of the nonvolatile memory.

6. The method of claim 1, wherein:
the status information of the nonvolatile memory is a difference value between a number of erase operations of the meta data region and a number of erase operations of the memory block,
the meta data manager, in response to determining that the difference value is less than a reference value, stores the meta log to the meta data region of the nonvolatile memory, and
in response to determining that the difference value is greater than or equal to the reference value, the meta data manager does not store the meta log to the meta data region of the nonvolatile memory.

7. The method of claim 1, wherein:
the status information of the nonvolatile memory is a number of received power off notice signals to the memory controller during a period of time,
the meta data manager, in response to determining that the number of received power off notice signals is less than a reference value, stores the meta log to the meta data region of the nonvolatile memory, and
in response to determining that the number of received power off notice signals is greater than or equal to the reference value, the meta data manager does not store the meta log to the meta data region of the nonvolatile memory.

8. The method of claim 1, wherein the memory controller comprises a Random Access Memory (RAM) configured to store the meta log.

9. The method of claim 8, wherein the storing of the meta log in the RAM comprises:
programming the meta log, stored to the RAM, to the meta data region of the nonvolatile memory; and
storing a power off notice signal receiving mark to an adjacent page of a page storing the meta log of the meta data region.

10. The method of claim 1, wherein the meta log comprises the physical address.

11. The method of claim 1, wherein the meta data region comprises initial meta data including a plurality of meta indexes and the meta log.

12. The method of claim 1, wherein the nonvolatile memory comprises a three dimensional flash memory cell array implementing the meta data region and the user data region.

13. A method of operating a memory controller including a meta data manager and being configured to control an operation condition of a nonvolatile memory including a meta data region and a user data region, the method comprising:
programming data to a word line of a memory block of the user data region of the nonvolatile memory;
by operation of the meta data manager, generating a meta log based on the programming;
storing the generated meta log to the memory controller; and
upon a power off operation, selectively storing the meta log to the meta data region based on a number of programming operations performed to the memory block, wherein:
the word line corresponds to a main part and a spare part, the data is stored at the main part, and
a logical address corresponding to the word line is stored at the spare part,
and wherein: the meta data region comprises a meta page, the meta page comprises a meta main part and meta spare part, and the meta data manager stores mapping information to the meta main part and stores a meta index to the meta spare part.

14. The method of claim 13, wherein the memory controller comprises a Random Access Memory (RAM) and the meta log is stored in the RAM.

15. The method of claim 14, wherein the selectively storing the meta log to the meta data region comprises:
programming the meta log stored in the RAM to the meta data region of the nonvolatile memory; and programming a power off notice signal to an adjacent page of a page programmed with the meta log of the meta data region.

16. The method of claim 13, wherein:
the meta data region comprises initial meta data, and the initial meta data comprises initial mapping information.

* * * * *